US009095492B2

(12) United States Patent
Verkaaik et al.

(10) Patent No.: US 9,095,492 B2
(45) Date of Patent: Aug. 4, 2015

(54) EXERCISE DEVICE AND SYSTEM

(75) Inventors: Julian Kyle Verkaaik, Christchurch (NZ); Jason Murray Nicholls, Christchurch (NZ); Marcus James King, Christchurch (NZ); Joseph John Olson, Baltimore, MD (US)

(73) Assignee: Industrial Research Limited, Lower Hutt (NZ)

( * ) Notice: Subject to any disclaimer, the term of this patent is extended or adjusted under 35 U.S.C. 154(b) by 864 days.

(21) Appl. No.: 13/129,930

(22) PCT Filed: Nov. 19, 2009

(86) PCT No.: PCT/NZ2009/000253
§ 371 (c)(1),
(2), (4) Date: Aug. 20, 2011

(87) PCT Pub. No.: WO2010/059066
PCT Pub. Date: May 27, 2010

(65) Prior Publication Data
US 2011/0300994 A1 Dec. 8, 2011

(30) Foreign Application Priority Data

Nov. 19, 2008 (NZ) .................................... 573008

(51) Int. Cl.
| | | |
|---|---|---|
| A63B 22/00 | (2006.01) | |
| A63B 71/00 | (2006.01) | |
| A61H 1/00 | (2006.01) | |
| A61H 1/02 | (2006.01) | |
| A61H 5/00 | (2006.01) | |
| A63B 21/012 | (2006.01) | |
| A63B 23/12 | (2006.01) | |
| A63B 24/00 | (2006.01) | |
| A63B 21/00 | (2006.01) | |
| A63F 13/20 | (2014.01) | |
| G06F 3/01 | (2006.01) | |
| A63F 13/65 | (2014.01) | |
| A63B 23/035 | (2006.01) | |
| G06F 3/03 | (2006.01) | |
| A63B 71/06 | (2006.01) | |
| A63B 23/14 | (2006.01) | |

(52) U.S. Cl.
CPC ............ *A61H 1/0274* (2013.01); *A61H 1/0285* (2013.01); *A63B 21/00178* (2013.01); *A63B21/012* (2013.01); *A63B 21/159* (2013.01); *A63B 22/0002* (2013.01); *A63B 22/0061* (2013.01); *A63B 23/03533* (2013.01); *A63B 23/12* (2013.01); *A63B 23/1254* (2013.01); *A63B 24/0003* (2013.01); *A63F 13/06* (2013.01); *A63F 13/65* (2014.09); *G06F 3/017* (2013.01); *G06F 3/03* (2013.01); *A61H 2001/0203* (2013.01); *A61H 2201/1261* (2013.01); *A61H 2201/1276* (2013.01); *A61H 2201/169* (2013.01); *A61H 2201/1638* (2013.01); *A61H 2201/1659* (2013.01); *A61H 2201/5007* (2013.01); *A61H 2201/5061* (2013.01); *A61H 2201/5097* (2013.01); *A63B 23/14* (2013.01); *A63B 2022/003* (2013.01); *A63B 2022/0005* (2013.01); *A63B 2022/0053* (2013.01); *A63B 2022/0074* (2013.01); *A63B 2022/0094* (2013.01); *A63B 2024/0096* (2013.01); *A63B 2071/0647* (2013.01); *A63B 2071/0652* (2013.01); *A63B 2220/05* (2013.01); *A63B 2220/13* (2013.01); *A63B 2220/51* (2013.01); *A63B 2220/58* (2013.01); *A63B 2220/806* (2013.01)

(58) Field of Classification Search
CPC ....... A61H 1/02; A61H 1/0285; A61H 1/024; A61H 2001/0207; A61H 1/003; A61H 1/0288; A61H 2201/1635; A61H 1/0274; A61H 2201/0153; A61H 2201/1676; A61H 2201/1638; A61H 2201/5097; A61H 2201/169; A61H 2201/1659; A61H 2201/1261; A61H 2201/1276; A61H 2001/0203; A61H 2201/5061; A61H 2201/5007; A63B 21/00181; A63B 2022/0005; A63B 21/00178; A63B 2023/006; A63B 21/1469; A63B 22/0002; A63B 22/0005; A63B 22/001; A63B 22/0012; A63B 22/0048; A63B 2022/0051; A63B 2022/0053; A63B 22/0056; A63B 22/0058; A63B 22/0061; A63B 22/0064; A63B 2022/0066; A63B 22/0069; A63B 2022/0071; A63B 2022/0074; A63B 23/0355; A63B 23/03558; A63B 23/03566; A63B 23/12; A63B 23/1209; A63B 23/1245; A63B 23/1254; A63B 23/1263; A63B 23/1272; A63B 23/1281; A63B 23/14; A63B 23/16; A63B 21/159; A63B 24/0003; A63B 21/012; A63B 2022/003; A63B 2071/0652; A63B 2024/0096; A63B 2071/0647; A63B 2220/13; A63B 2022/0094; A63B 2220/58; A63B 2220/806; A63B 2220/05; A63B 2220/51; F16H 21/02; G06F 3/017; A63F 13/65; A63F 13/06

USPC ......... 482/44–46, 49–52, 62, 70–72, 92, 123, 482/126, 133–139, 148; 601/5, 23, 27–35, 601/40; 434/166, 247–261; 248/118–118.5; 297/75–76, 83–91, 411.2–423.46

See application file for complete search history.

(56) References Cited

U.S. PATENT DOCUMENTS

| | | | |
|---|---|---|---|
| 4,629,185 | A | 12/1986 | Amann |
| 5,254,066 | A * | 10/1993 | Brown et al. .................. 482/137 |
| 6,149,612 | A * | 11/2000 | Schnapp et al. ................ 601/23 |
| 6,234,935 | B1 * | 5/2001 | Chu ................................ 482/51 |
| 6,364,816 | B1 * | 4/2002 | Tang et al. ..................... 482/126 |
| 6,554,234 | B2 * | 4/2003 | Holdren ..................... 248/118.5 |
| 7,121,981 | B2 * | 10/2006 | Whitall et al. ..................... 482/8 |
| 2003/0207739 | A1 * | 11/2003 | Whitall et al. .................. 482/92 |
| 2005/0159276 | A1 * | 7/2005 | Falcone ........................ 482/123 |
| 2005/0159683 | A1 * | 7/2005 | Kuo .................................. 601/5 |
| 2006/0106326 | A1 * | 5/2006 | Krebs et al. ..................... 601/40 |
| 2006/0194677 | A1 * | 8/2006 | Whitall et al. .................. 482/92 |
| 2007/0202994 | A1 * | 8/2007 | Alessandri et al. ............. 482/51 |
| 2007/0299371 | A1 * | 12/2007 | Einav et al. ....................... 601/5 |
| 2008/0004550 | A1 * | 1/2008 | Einav et al. ..................... 601/33 |
| 2008/0161733 | A1 * | 7/2008 | Einav et al. ..................... 601/34 |
| 2010/0248921 | A1 * | 9/2010 | Shinomiya et al. ........... 482/142 |

FOREIGN PATENT DOCUMENTS

| | | |
|---|---|---|
| WO | WO 01/56662 A | 8/2001 |
| WO | WO 2009/070042 A | 6/2009 |

OTHER PUBLICATIONS

Lum PS; Burgar CG; Van Der Loos M; Shor PC; Majmundar M; Yap R.: MIME robotic device for upper-limb nerorehabilitation in subacute stroke subjects: A follow-up study. *Journal of rehabilitation research and development* Aug.-Sep. 2006; vol. 43 (issue 5), pp. 631-642.

Jill Whitall; Sandy McCombe Waller; Kenneth H. C. Silver, Richard F. Macko: "Repetitve Bilateral Arm Training with Rhythmic Auditory Cueing Improves Motor Function in Chronic Hemiparetic Stroke" (*Stroke, Journal of the American Heart Association.* 2000;31:2390-2395.).

Stinear, James W.; Byblow, Winston D.: "Rhythmic Bilateral Movement Training Modulates Corticomotor Excitability and Enhances Upper Limb Motricity Poststroke: A pilot study". *Journal of Clinical Nerophysiology.* 21(2): pp. 124-131, Mar./Apr. 2004.

* cited by examiner

*Primary Examiner* — Oren Ginsberg
*Assistant Examiner* — Joshua Lee
(74) *Attorney, Agent, or Firm* — Frommer Lawrence & Haug LLP; Ronald R. Santucci

(57) ABSTRACT

A bilateral upper limb exercise device (10) for exercising a user's arms comprising a central mounting structure (12) that is mountable to a fixed surface or structure (15), left and right limb supports (14a, 14b) for supporting the forearm and/or hand of a respective arm of the user, and a pair of articulated linkage arms (22a, 22b) that are pivotably coupled to opposite sides of the central mounting structure (12) and which are arranged to support a respective limb support (14a, 14b) for movement in at least two degrees of freedom in a two-dimensional (2D) movement plane. A mirroring mechanism is also operatively coupled to the articulated linkage arms (22a, 22b) such that movement of the opposing limb support relative to a central line of symmetry of the device.

43 Claims, 19 Drawing Sheets

EXERCISE DEVICE AND SYSTEM

This application is a 371 of PCT/NZ2009/000253 filed on Nov. 19, 2009, published on May 27, 2010 under publication number WO 2010/059066 A and claims priority benefits of New Zealand Patent Application No. 573008 filed Nov. 19, 2008, the disclosure of which is incorporated herein by reference.

FIELD OF THE INVENTION

The present invention relates to an exercise device and system for exercising a user's upper limbs. In particular, although not exclusively, the exercise device and system is a bilateral arm trainer for use by patients who are suffering from hemiparesis, for example due to a stroke or other neurological injury.

BACKGROUND TO THE INVENTION

A patient with hemiparesis is typically able to move one arm in a normal manner, but the other arm on the opposite side of their body is at least partially paralysed. In simple terms, the paralysis of the arm is caused by damage to the brain in areas that control the arm or that side of the body. Physically, there is actually nothing actually wrong with the paralysed limb. Neuroplastic recovery from brain injury and the rehabilitation of an affected arm by bilateral relearning and cortical remodeling is well known. Briefly, this involves retraining undamaged parts of the brain, which previously carried out different functions from controlling limbs, to control the paralysed limbs. Neuroplasticity is the fundamental issue that supports the scientific basis for treatment of acquired brain injury with goal-directed experiential therapeutic programs in the context of rehabilitation approaches to the functional consequences of the injury.

Some exercise devices have been developed to assist with the retraining rehabilitation for the affected limbs. One example is the bilateral arm trainer proposed in U.S. Pat. No. 7,121,981. This bilateral arm trainer comprises a pair of sliding tracks along with a pair of handles that can slide back and forth along a respective track. The handles can be either yoked or unyoked and arm exercises involving repetitive push and pull movements by sliding the handles back and forth along the track are used in the rehabilitation process.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved exercise device and/or exercise system for bilateral upper limb training, or to at least provide the public with a useful choice.

SUMMARY OF THE INVENTION

In a first aspect, the present invention broadly consists in a bilateral upper limb exercise device for exercising a user's arms, comprising: a central mounting structure that is mountable to a fixed surface or structure; left and right limb supports for supporting the forearm and/or hand of a respective arm of the user; a pair of articulated linkage arms that are pivotally coupled to opposite sides of the central mounting structure and which are arranged to support a respective limb support for movement in at least two degrees of freedom in a two-dimensional (2D) movement plane; and a mirroring mechanism that is operatively coupled to the articulated linkage arms such that movement of one limb support by a user causes a corresponding mirrored movement of the opposing limb support relative to a central line of symmetry of the device.

Preferably, each articulated linkage arm may comprise an inner arm and an outer arm that are coupled together at one end by a pivot joint, and wherein the inner arm is pivotally coupled to the central mounting structure at its other end and the outer arm being arranged to support its respective limb support at or toward its other end.

Preferably, each limb support may be pivotally mounted at or toward an outer end of the outer arm of its respective articulated linkage arm. In one form, each limb support may be pivotally mounted to the outer arm of its respective articulated linkage arm such that the limb support can freely rotate at or toward the end of the outer arm with respect to an axis that is substantially perpendicular to the 2D movement plane. Additionally or alternatively, each limb support may be pivotally mounted to the outer arm of its respective articulated linkage arm such that the limb support can freely tilt into or out of alignment with the movement plane. In an alternative form, the limb supports may be fixedly mounted in position and orientation on their respective articulated linkage arms.

Preferably, each limb support may comprise a forearm rest that is arranged to support a user's forearm and a hand rest that is arranged to support a user's hand.

Preferably, the limb supports may be provided with one or more removable hand grip or hand support devices that are arranged to be gripped by a user and which are releasably mountable to the limb support. In one form, the hand grip device is in the form of a joystick component that is securable to the limb support at a desired position and orientation. In another form, the hand support device is in the form of a hemispherical shaped support component over which the palm of the user's hand may rest.

Preferably, at least one of the limb supports may comprise one or more securing straps that may be fastened around the user's forearm and/or hand to secure it into the limb support.

In one form, the mirroring mechanism may comprise a gearing system that is operatively coupled to the pivotal movement of both the inner and outer arms of the articulated linkage arms such that movement of either linkage arm in the 2D movement plane causes a corresponding mirrored movement of the other linkage arm about the line of symmetry. Preferably, the mirroring mechanism may comprise a first pair of gears, each gear extending from an end of a respective inner arm of the articulated linkage arms at the central mounting structure and which mesh together at the line of symmetry of the central mounting structure; and a second pair of gears at the central mounting structure, each gear being operatively coupled by a connecting rod to a respective outer arm of the articulated linkage arms and which mesh together at the line of symmetry of the central mounting structure, the first and second set of gears rotating in response to pivotal movement of either of their respective inner and outer arms so as to cause a corresponding mirrored pivotal movement of the other inner and outer arms.

Preferably, the exercise device may further comprise an adjustable resistance system that is operable to apply a level of resistive force to movement of the limb supports in the 2D movement plane. More preferably, the adjustable resistance system may comprise first and second adjustable friction brakes associated with the respective first and second pairs of gears, each adjustable friction brake comprising a brake pad that is arranged to contact a surface of one of the gears of its respective pair of gears and an operable brake tensioner that is operable by a user to increase or reduce the pressure applied to the gear by the brake pad as desired to alter the resistance applied to movement of the limb supports.

In another form, the mirroring mechanism may comprise a slider track that extends long the line of symmetry; and first and second sliders that are arranged for slidable movement along the slider track, the first slider being operatively coupled to the inner arms of the articulated linkage arms and the second slider being operatively coupled to the outer arms of the articulated linkage arms such that movement of either linkage arm in the 2D movement plane causes a corresponding mirrored movement of the other linkage arm about the line of symmetry.

In another form, the mirroring mechanism may comprise an elongate slider track that defines the line of symmetry; a first slider that is arranged for slidable movement along the slider track and which is operatively coupled to the inner arms of the articulated linkage arms by respective connecting rods such that pivotal movement of one inner arm causes a corresponding mirrored movement of the other inner arm about the line of symmetry; and a second slider that is arranged for slidable movement along the slider track and which is operatively coupled to the outer arms of the articulated linkage arms by respective connecting rods such that pivotal movement of one outer arm causes a corresponding mirrored movement of the other outer arm.

Preferably, the exercise device may further comprise an adjustable resistance system that is operable to apply a level of resistive force to movement of the limb supports in the 2D movement plane. More preferably, the adjustable resistance system may comprise an braking clamp or braking caliper that is mounted to each slider and which is operable to clamp to the slider track with varying degrees of force to thereby resist movement of the sliders along the slider track and therefore resist movement of the limb supports in their 2D movement plane as desired. Alternatively, the adjustable resistance system may comprise two non-rotating pulleys, one mounted to each slider, and a tensioning cable or rope that is wrapped around the pulleys such that the tension of the rope can be adjusted to increase resistance on movement of the pulleys and thereby their respective sliders along the slider track.

Preferably, the central mounting structure may comprise an adjustable tilting mechanism that is operable to adjust the tilt of the 2D movement plane relative to the horizontal.

Preferably, the central mounting structure may comprise a slidable support clamp that is securable to an upright member extending vertically from a fixed structure or surface, the support clamp being releasable to allow the height of the exercise device to be adjusted by slidable movement of the support clamp up or down the upright member.

Preferably, the central mounting structure may comprise a rotatable support clamp that is securable to an upright member extending vertically from a fixed structure or surface, the support clamp being releasable to allow the position of the exercise device to be adjusted by rotatable movement of the support clamp about the upright member.

In some forms, the central mounting structure may be arranged to allow free vertical movement of the exercise device to thereby provide a third degree of freedom of movement for the limb supports.

Preferably, the bilateral upper limb exercise device may further comprise a balance sensing and feedback system that is arranged to continuously sense the load applied to each of the articulated linkage arms during movement of the limb supports and output data representing the balance of work done between the user's left and right arms. More preferably, the balance sending and feedback system comprises two loadcell sensors, each being operatively coupled to a respective articulated linkage arm and being configured to sense load applied through the arm during movement of the limb support by the user and generating representative output load signals for processing.

In a second aspect, the present invention broadly consists in an exercise system comprising: a bilateral upper limb exercise device comprising: a central mounting structure that is mountable to a fixed surface or structure; left and right limb supports for supporting the forearm and/or hand of a respective arm of the user; a pair of articulated linkage arms that are pivotably coupled to opposite sides of the central mounting structure and which are arranged to support a respective limb support for movement in at least two degrees of freedom in a two-dimensional (2D) movement plane; and a mirroring mechanism that is operatively coupled to the articulated linkage arms such that movement of one limb support by a user causes a corresponding mirrored movement of the opposing limb support relative to a central line of symmetry of the device; a position tracking system that is arranged to sense and track movement of the limb supports of the exercise device and generate representative position data for tracking movement of the limb supports in the 2D movement plane; and an interface for sending the position data to an associated interactive gaming system to enable a user of the exercise device to interact with the gaming system via movement of the limb supports.

In a third aspect, the present invention broadly consists in an exercise system comprising: a bilateral upper limb exercise device comprising: a central mounting structure that is mountable to a fixed surface or structure; left and right limb supports for supporting the forearm and/or hand of a respective arm of the user; a pair of articulated linkage arms that are pivotably coupled to opposite sides of the central mounting structure and which are arranged to support a respective limb support for movement in at least two degrees of freedom in a two-dimensional (2D) movement plane; and a mirroring mechanism that is operatively coupled to the articulated linkage arms such that movement of one limb support by a user causes a corresponding mirrored movement of the opposing limb support relative to a central line of symmetry of the device; a position tracking system that is arranged to sense and track movement of the limb supports of the exercise device and generate representative position data for tracking movement of the limb supports in the 2D movement plane; and an interactive gaming system that is arranged to receive the positional data as input to enable a user to interact with a game presented on a display screen.

The bilateral upper limb exercise device of the second and third aspects of invention may have any one or more of the features mentioned in respect of the first aspect of the invention. The exercise systems of the second and third aspects may also have any one or more of the features that follow.

Preferably, the interactive gaming system may be in the form of a personal computer having a display screen upon which the game is present and the personal computer being programmed to receive and process the position data as user input to interact with the game.

In one form, the position tracking system may comprise a camera that is arranged to capture continuous images of a portion of the 2D movement plane and an image processing system that is arranged to process the images to sense and track movement of one or both limb supports that are visible in the portion of the 2D movement plane to generate representative position data.

In another form, the position tracking system may comprise one or more movement sensors integrated into the articulated linkage arms of the exercise device and which are arranged to sense pivotal movement of the arms and generate representative position data.

Preferably, the exercise system may further comprise a balance sensing and feedback system that is arranged to continuously sense the load applied to each of the articulated linkage arms during movement of the limb supports and output data representing the balance of work done between the user's left and right arms.

In one form, the game may be a line-tracing game that displays a target line for the user to trace with a cursor that is controlled via movement of one of the limb supports.

In a fourth aspect, the present invention may broadly consist in a method of bilateral upper limb exercise training, comprising: providing an exercise system according to either the second or third aspects of the invention; and initiating a user interactive game on the gaming system to motivate the user to carry out exercise on the bilateral upper limb exercise device of the exercise system.

In a fifth aspect, the present invention broadly consist in a bilateral upper limb exercise device for exercising a user's arms, comprising: a base support that is mountable to a fixed surface or structure; left and right limb supports provided in a symmetrical arrangement on opposite sides relative to the base support for supporting the forearm and/or hand of a respective arm of the user; a support system for the limb supports that enables each to move with at least two degrees of freedom in a movement plane; and a mirroring mechanism that is operatively coupled to the limb supports and/or support system such that movement of one limb support by a user causes a corresponding mirrored movement of the opposing limb support relative to a central line of symmetry of the base support.

The fifth aspect of the invention may have any one or more of the features mentioned in respect of the first aspect of the invention.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

Overview

The invention relates to a bilateral upper limb exercise device, and an exercise system that includes the exercise device, for exercising a user's upper limbs. The exercise device is intended for use in rehabilitating patients suffering hemiparesis that causes one upper limb to be at least partially paralysed. For example, the exercise device can be used for neuroplastic retraining rehabilitation techniques for enabling patients to regain control of their paralysed upper extremities, including shoulders, elbows, wrists and fingers. Although the exercise device is primarily for rehabilitation of patients suffering hemiparesis, it will be appreciated that the exercise device may also be used for bilateral training and exercising of upper limbs in other contexts.

Exercise System Overview

Figure 1:
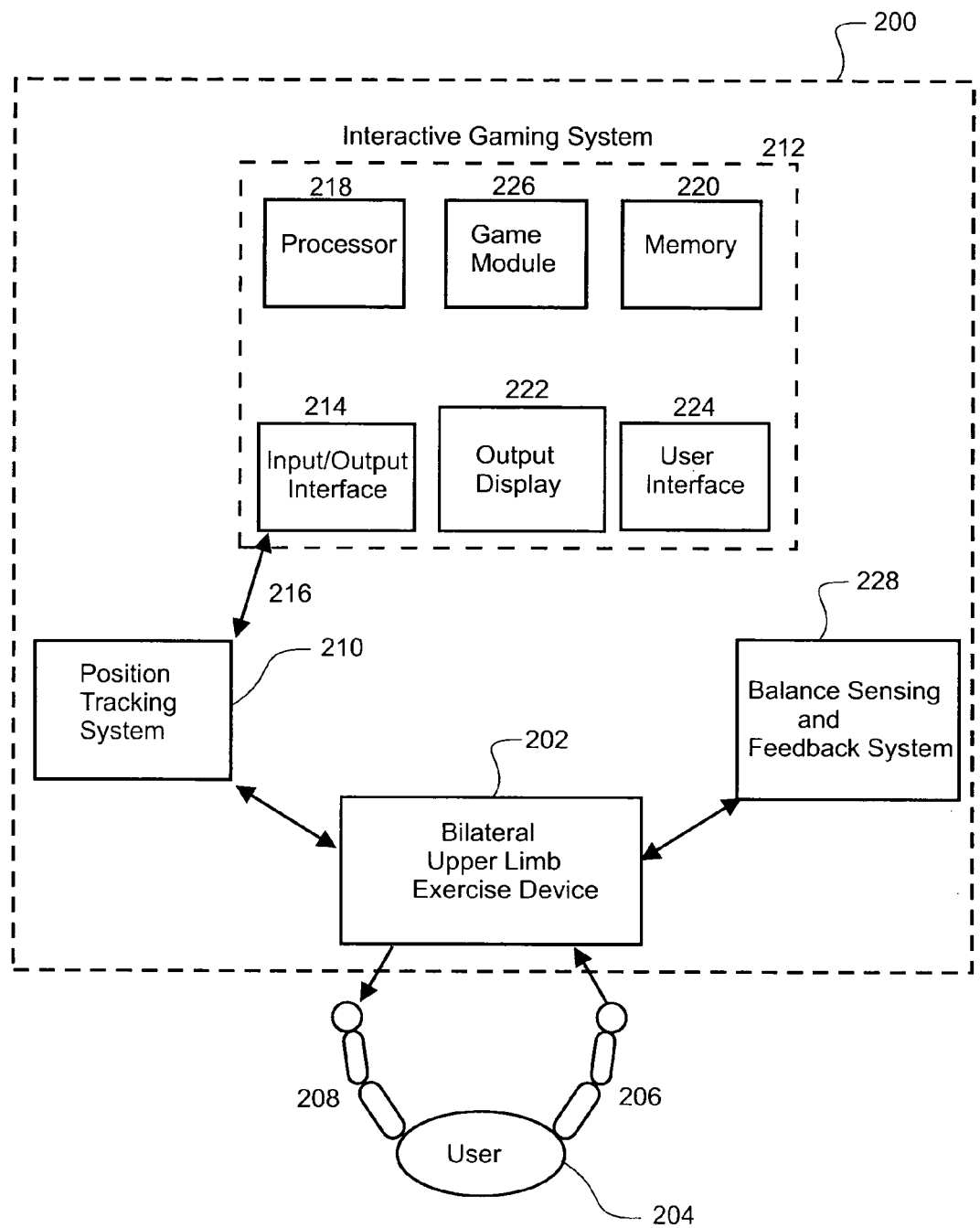
FIG. 1 shows a block diagram of the main components of an overall exercise system including an interactive gaming system in accordance with a first preferred embodiment of the invention.
Figure 2:
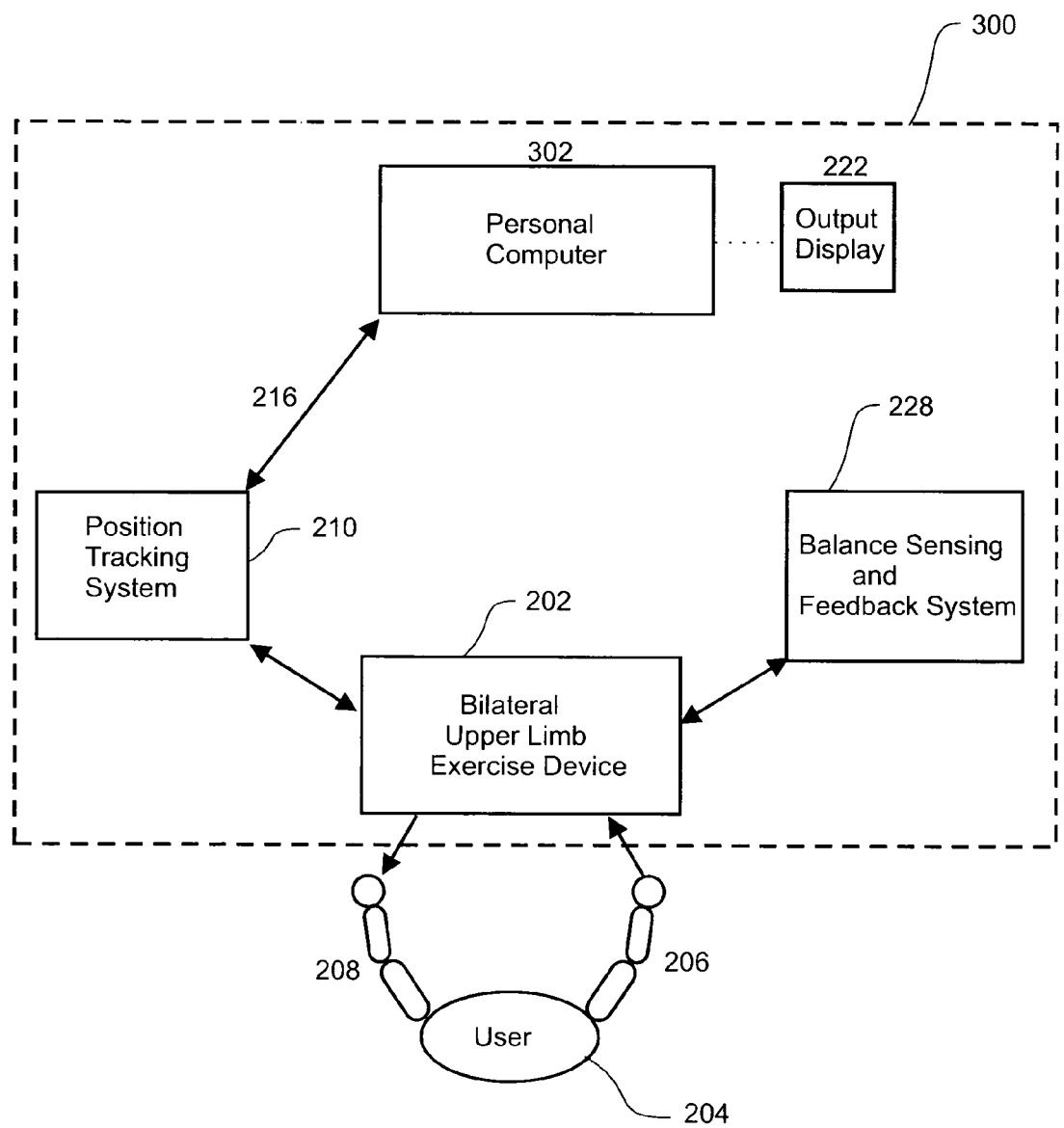
FIG. 2 shows a block diagram of the main components of an exercise system of FIG. 1 in accordance with a second preferred embodiment of the invention in which the interactive gaming system is in the form of a personal computer.

Referring to FIGS. 1 and 2, the main components and modules of preferred embodiments of the exercise system will be explained. After this overview, each of the individual components and modules will be explained in more detail.

Referring to FIG. 1, the main components and modules of a first preferred embodiment of the exercise system 200 are shown. The exercise system 200 comprises a bilateral upper limb exercise device 202 that is arranged for operation by the upper limbs 206,208, such as left and right arms, of a user 204. The exercise device 202 is mountable to a fixed surface, such as a height adjustable table, or other fixed structure such as a wall, pole, framework or the like. The exercise device 202 comprises left and right limb supports that are provided in a symmetrical arrangement on opposite sides of the device. A user 204 is able to sit or stand in front of the exercise device 202 and place or secure their forearms and/or hands of their arms 206,208 in the limb supports. In use, the limb supports are configured to allow at least two-dimensional (2D) movements with respect to a 2D movement plane, which may be a horizontal or angled plane relative to the user. In particular, each limb support has two degrees of freedom in the 2D movement plane such that the user can move their left and right arms forward and back, side-to-side, or any combination these movements. Additionally, some embodiments of the exercise device may also optionally be arranged to provide for 3D limb movements by allowing the limb supports to move vertically up and down relative to the primary 2D movement plane. In some embodiments, the limb supports are configured for free movement, but adjustable braking systems may be provided to enable resistance to be applied to the movement as desired.

To enable neuroplastic retraining of an affected or partially paralysed upper limb, the exercise device comprises a mirroring mechanism that operatively links both limb supports to each other, such that movement of one limb support causes a corresponding mirrored movement of the other limb support, whether in the 2D or 3D context, relative to the line of symmetry located centrally between the limb supports and the user's body centerline. For example, the user may use their normal or unaffected arm 206 to perform a particular movement in the 2D movement plane and this movement is copied or translated via the mirroring mechanism to thereby cause a corresponding movement of the other limb support and their affected or partially paralysed 208 arm secured in or carried by that limb support. Repetitive exercises of this nature helped the patient to progressively regain motor control or re-learning of the affected or paralysed limb.

As mentioned, the exercise device 202 can be utilised as a training device on its own if desired. However, increased training motivation and effectiveness can be obtained by providing the exercise device as part of an overall interactive gaming or exercise system. Goal-directed or task-based exercises provide a more effective form of rehabilitation to otherwise passive exercising. The interactive game provides a task or goal that integrates with the exercise. In particular, the exercise device may be configured to function as a user interface or user input device for an electronic video game or other software application that presents on a display screen.

In a first preferred embodiment, the exercise system 200 comprises the bilateral upper limb exercise device 202 and a position tracking system 210 that is arranged to sense and track the 2D and/or 3D movement of one or both limb supports, or parts of one or both of the user's upper limbs that are supported in the limb supports, and which is configured to generate continuous representative position data 216 relating to position and movement of one or both of the user's limbs. The position data or position signals 216 are sent to a control or interactive gaming system 212 having a hardware platform upon which a video game or other interactive software application runs. By way of example, the interactive gaming system 212 may comprise an input/output interface 214 that is arranged to receive the position data or position signals 216 from the position tracking system 210 for processing and as input to control the interactive game. The interactive gaming system 212 also comprises various other modules or components required to provide an interactive video game, such as a processor 218, memory 220, and an output display 222 upon which the game is displayed. A separate user interface 224 may also be provided to connect to other conventional user input or control devices, such as a keyboard, mouse, joystick, gaming controller or any combination of these or similar control devices. A game module 226 or gaming machine may also be provided that is arranged to store the game for loading and running.

In operation, the user may move their limbs to interact with the gaming system 212 and perform the required gaming tasks as displayed on the output display 222. The user' limb movements are sensed and tracked so as to enable the user to control the game, much like using their limb movement in place of a mouse or joystick to move a cursor or otherwise interact with the game as displayed on the output display 222. It will be appreciated that the user's limbs or graphical limb representations may also be incorporated into an augmented or virtual reality type gaming environment. For example, the images or videos of the user's limbs may be continuously captured and directly displayed the output display 222 and may be configured to interact with the gaming environment in an augmented reality application. It is preferred, but not essential, that the position tracking system focus on the affected limb or alternatively the combination of both limbs, so that the interaction with the video game appears to the user to be driven by the affected limb rather than the normal limb. This provides the appearance of the affected limb achieving the task or goal of the exercise and so provides a more effective rehabilitation experience.

Optionally, the exercise system may include a balance sensing and feedback system 228. In some embodiments, this balance sensing and feedback system 228 may augment the interactive gaming system, but in alternative embodiments the exercise system may comprise the bilateral upper limb exercise device 202 and only the balance sensing and feedback system 228. The balance sensing and feedback system is arranged to sense a measure indicative of the level of work or load applied to the left and right limb supports by the user and to compare these loads in order to provide a measure of the balance of the work applied by the user. This type of information can be useful to assist the user and/or their clinician in determining which arm is performing more work, and whether the user is exercising in a balanced fashion. This can be used to encourage the user to attempt to utilize their affected or partially paralysed limb in an equal amount to the normal or unaffected limb. The system 228 is also arranged to provide real-time feedback to the user and/or their clinician in the form of a gauge, level or other feedback indicator, whether visual, audible or otherwise, about the state of balance of the exercise device in use. It will be appreciated that the left and right load data information can be stored for subsequent analysis.

Referring to FIG. 2, a second preferred embodiment exercise system 300 is shown. The exercise system 300 is similar to the first preferred embodiment exercise system with like components being represented by like reference numerals. In the second preferred embodiment exercise system 300, the interactive gaming system is provided on a hardware platform that is a personal computer 302. It will be appreciated that the gaming software or other interactive application may run on the computer 302 and be displayed on the computer's output display.

Preferred forms of the bilateral upper limb exercise device and the main components and modules of the overall exercise system will now be described in further detail.

First Preferred Form of the Exercise Device

Referring to FIGS. 3-12, a first preferred form of the exercise device 10 will be described. The exercise device 10 is mountable, directly or indirectly, to any suitable structure or surface, including a table, wall, pole, framework or the like. In the first preferred form, the exercise device 10 comprises a central main housing 12 that is arranged to be mountable to the desired structure or surface. Various types of mounting, coupling or fixing systems can be used, and examples will be described further below. In the preferred form, the central main housing 12 is partially enclosed, but could be fully enclosed in other forms. The main housing 12 comprises top 12a and bottom 12b plates that are coupled together by front 12c and rear 12d coupling walls or panels. It will be appreciated that any other suitable form of base support structure or surface, central frame, or central mounting surface or structure can alternatively be utilised if desired, whether fully open, partially closed, or fully enclosed.

The main housing 12 may be fixedly mounted or coupled to a desired structure or surface at a predetermined position and orientation or alternatively the exercise device may have an adjustable mounting system. The adjustable mounting system may employ a pivotal coupling, hinging mechanism, tilting mechanism, rotatable coupling, sliding coupling, or a combination of these depending on the degrees of freedom of adjustability required.

Referring to FIGS. 5-8, the first preferred form exercise device 10 is shown mounted to a horizontal table surface 15, and in particular an upright support member 17 extending vertically upward from the table surface. In the preferred form, the upright support member 17 is in the form of a hollow cylindrical pole, but it will be appreciated that any other upright member having any other cross-sectional shape, and being either solid or hollow could alternatively be utilised. In this preferred form, the mounting system for the exercise device 10 comprises a slidable support clamp 19 that couples to the upright support member 17 at one end, and attaches to the central main housing 12 at the other end. In this preferred form, the slidable support clamp 19 extends substantially perpendicularly relative to the longitudinal axis of the upright support member 17 and is slidably adjustable in position up and down the upright support member to the desired height.

In this preferred form, the slidable support clamp 19 comprises two opposed plates 19a,19b that have clamping portions 23a,23b at one end that are shaped to conform to a side of the peripheral cylindrical surface of the upright support member 17 such that they can be clamped to each other around the upright support member by fasteners 21, such as nut and bolt assemblies or other releasable fastening components. At the other end, the plates 19a,19b comprise extension portions 25a,25b that extend from the shaped clamping portions beyond the upright support member 17 and which are preferably coupled or fixed to each other to collectively form a mounting support structure to which the central main housing 12 may attach as will be explained next.

In this preferred form, a flat mounting plate 27 extends downwardly from the bottom of the bottom plate 12b of the central main housing 12 and is pivotably coupled at pivotal coupling or connection 29 to the mounting support structure of the slidable support clamp 19. By way of example, the pivotal coupling 29 may be formed by a nut and bolt fastener or other cylindrical extension that extends between aligned apertures provided in the mounting support structure of the slidable support clamp 19 and the mounting plate 27. This pivotal connection arrangement forms an adjustable tilting mechanism that allows the exercise device to be tilted, such as inclined or declined relative to the horizontal table surface 15 to the desired angle as shown by arrows NN in FIG. 5. Tilting the exercise device allows the overall slope of the 2D movement plane to be adjusted and this can be used to increase or reduce the difficulty of moving the limb supports as desired or can be used to encourage the user to generate arm movements that have a lifting component as well as a horizontal reaching component.

Locking or fixing of the desired tilt angle is achieved by a locking system that is operable to lock the mounting plate 27 in position on the of the mounting support structure of the slidable support clamp 19. In this preferred form, the locking system comprises a series of apertures 31 through the mounting plate 27, one or more complimentary apertures 33 in the mounting support structure of the slidable support clamp 19, and a locking bolt that may be inserted through an aligned pair of apertures 31,33 to thereby secure and fix the exercise device at the desired tilt angle.

In this preferred form, the adjustable mounting system also comprises two other degrees of freedom of adjustment, namely height and rotation adjustment. By way of example, the height of the exercise device 10 above the table surface 15 may be adjusted by loosening the fastening devices 21 of the slidable support clamp 19 to allow the support clamp to be slid up or down the upright mounting pole 17 as indicated by arrows OO in FIG. 6. Additionally, the slidable support clamp 19 may be rotated about the cylindrical mounting pole 17 as shown by arrows PP in FIG. 8 when the fastening devices 21 are loosened. Once the desired height and/or rotation are obtained, the exercise device can be fixed in place by tightening the fastening devices 21 to fix the slidable support clamp 19 to the mounting pole 17.

Figure 3:
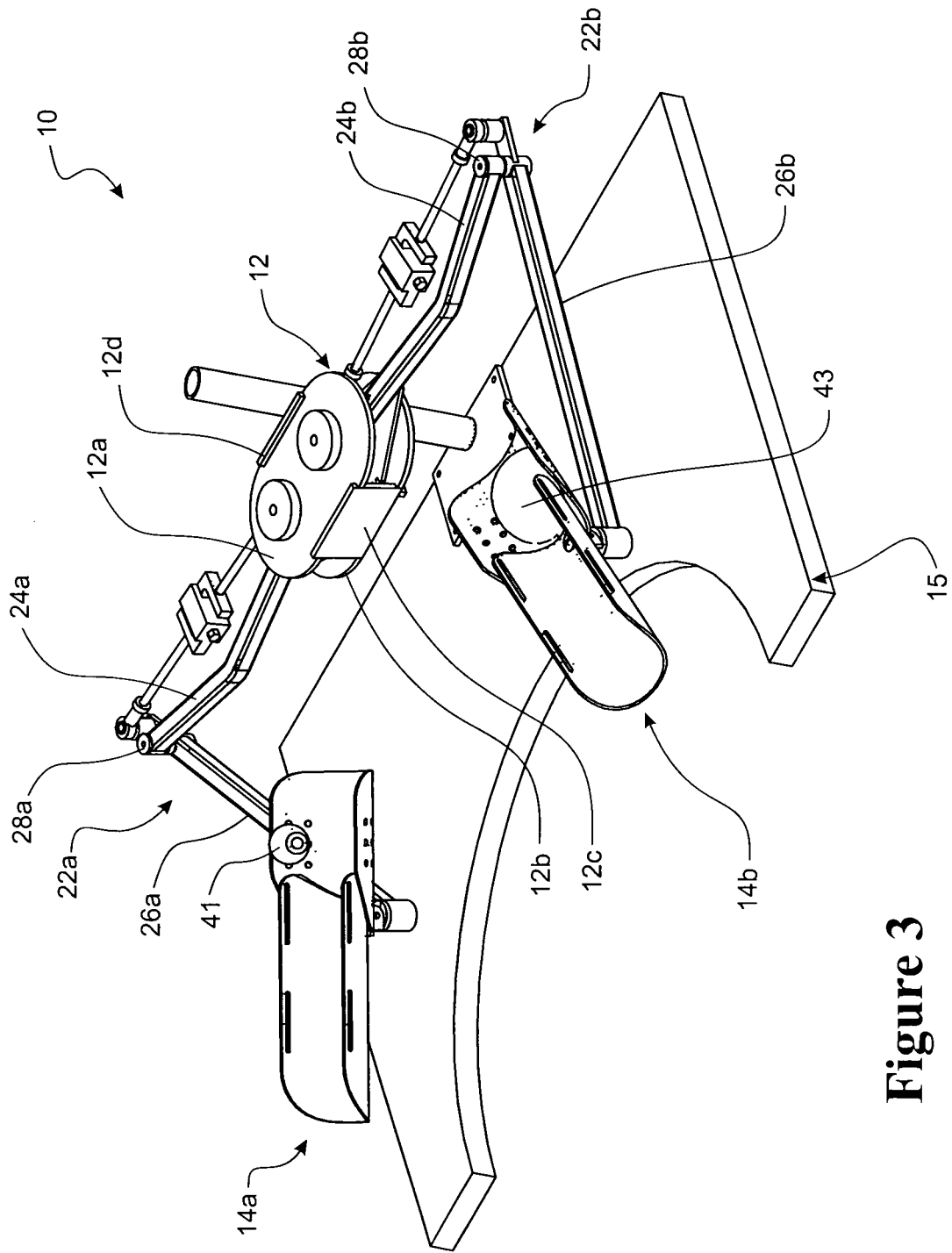
FIG. 3 shows an isometric view of a first preferred form of the bilateral upper limb exercise device of the invention.
Figure 4:
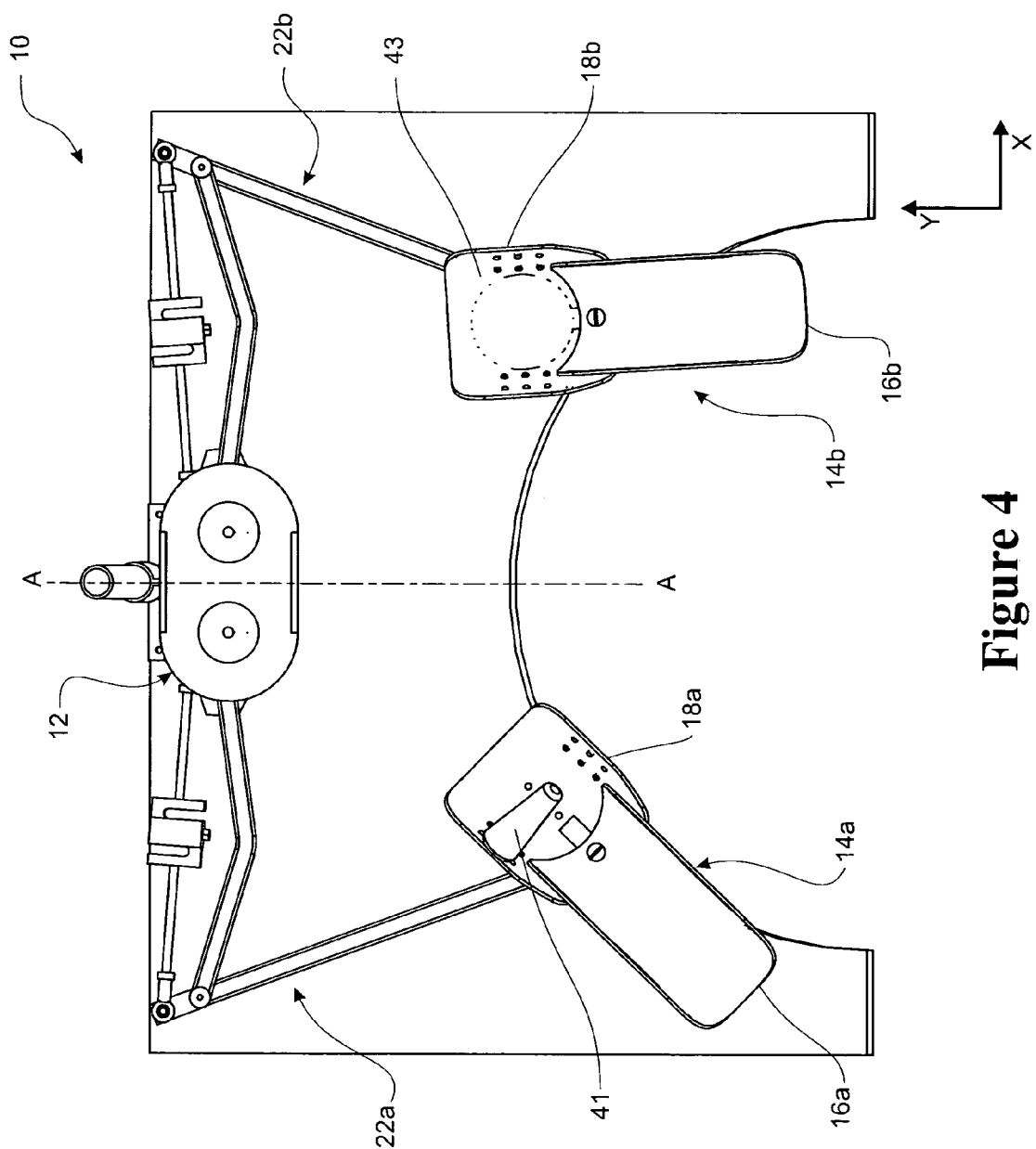
FIG. 4 shows a top plan view of the exercise device of FIG. 3.
Figure 5:
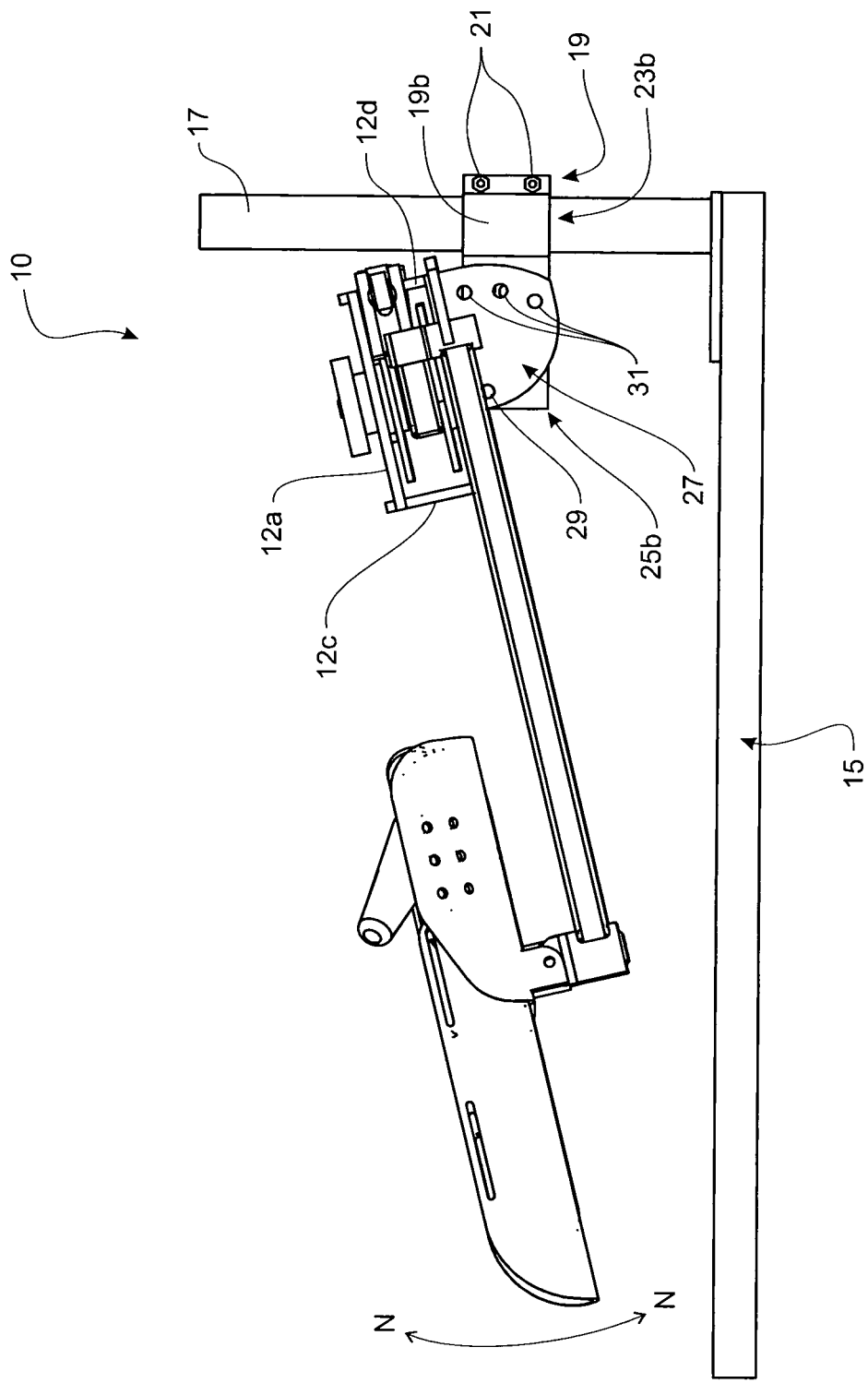
FIG. 5 shows a right-side elevation view of the exercise device of FIG. 3.
Figure 6:
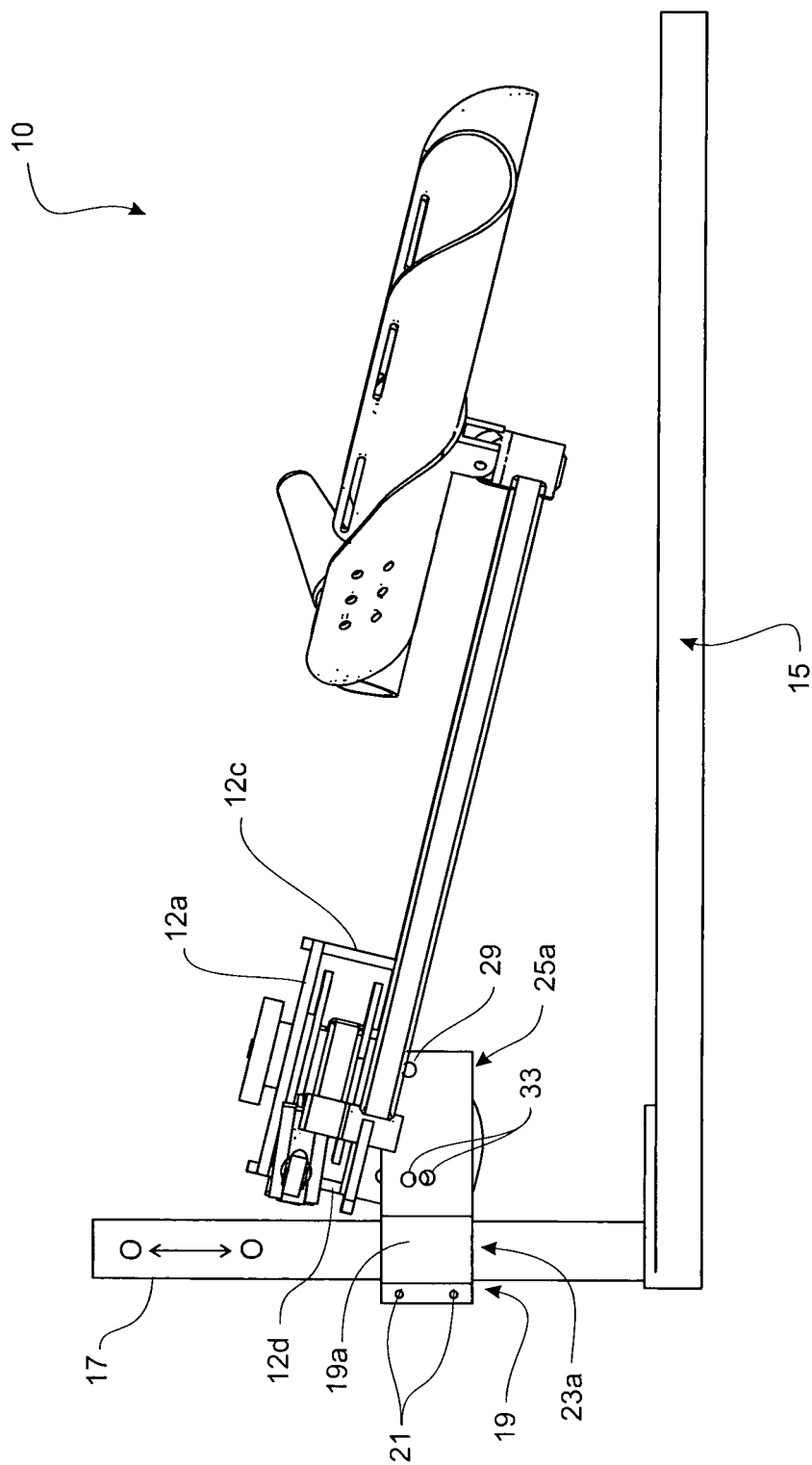
FIG. 6 shows a left-side elevation view of the exercise device of FIG. 3.
Figure 7:
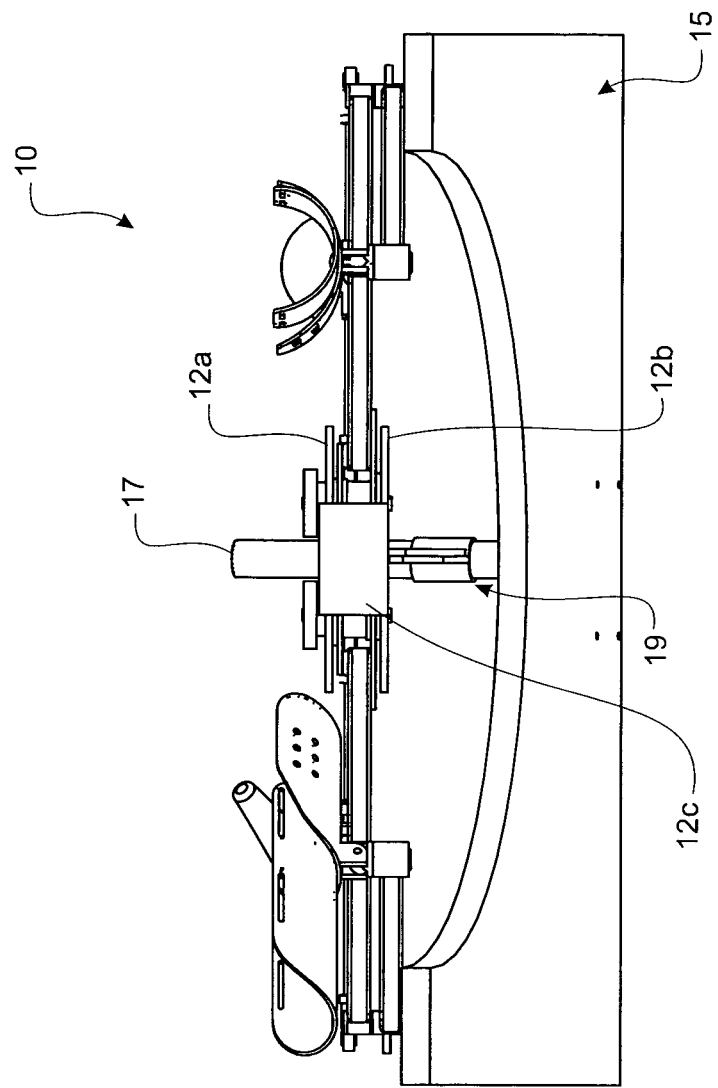
FIG. 7 shows a front-view of the exercise device of FIG. 3.
Figure 8:
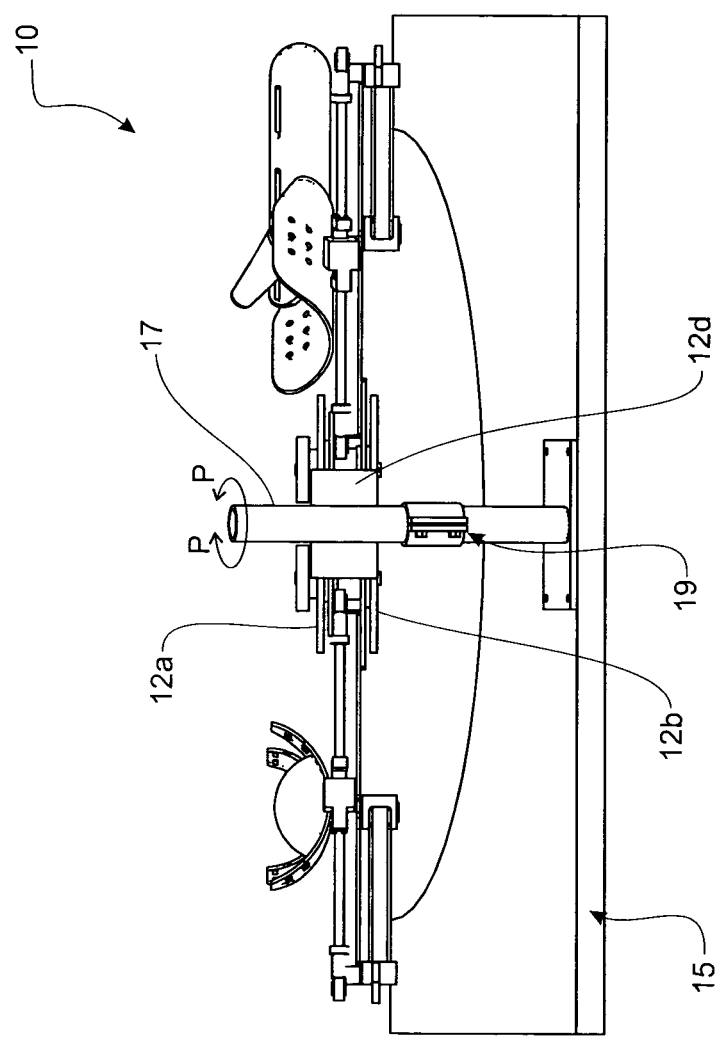
FIG. 8 shows a rear-view of the exercise device of FIG. 3.

Reverting to FIGS. 3 and 4, the exercise device 10 comprises left and right limb supports 14a,14b that are provided on opposite sides of the exercise device in a symmetrical arrangement relative to a centrally extending line of symmetry AA. Each limb support 14a,14b is moveably supported by a support system to enable each limb support to move with 2D degrees of freedom in a 2D movement plane, which in the first preferred form is an X-Y plane that has an orientation substantially parallel to that of the surface of the top 12a and bottom 12b plates of the central main housing 12. In particular, each limb support 14a,14b is moveable side-to-side (in the direction of axis X) and back and forth (in the direction of axis Y), or any combination of such movements in the 2D movement plane.

In this preferred form, each limb support 14a, 14b includes a forearm rest 16a,16b, such as a substantially U-shaped or semi-cylindrical elongate support pad, for receiving and supporting the forearms of a user. Additionally, the preferred form limb supports 14a,14b comprise enlarged substantially U-shaped hand rests 18a,18b that are coupled to and extend from the upper end of each respective forearm rest 16a,16b.

The limb supports may comprise either fixed or removable hand grip devices to assist the user to move the limb supports. In this preferred form, each of the hand rests 18a,18b are provided with a series of mounting apertures into which hand grip devices may optionally be mounted. By way of example only, the left limb support 14a is shown with a joystick 41 hand grip device comprising a conical or frustoconical member that the user may grip with their fingers and hand. The joystick 41 may comprise mounting extensions or protrusions that extend from the lower end of the joystick and which are arranged to securely engage in one or more of the complementary mounting apertures provided in the hand rest 18a. In this preferred form, a series or matrix of mounting apertures are provided to enable a selection of different joystick 41 mounting options in terms of orientation and position.

It will be appreciated that the limb supports may come in other forms and shapes to assist users with different levels and ability in terms of limb function and strength. For example, the limb supports may in alternative forms be provided with a hand grip or support device that is arranged to support a hand that may have limited grip due to the hemiparesis. By way of example, such a hand-support may take the shape of a hemispherical shaped support component or surface over which the palm of a hand may rest. An example of such a hemispherical shaped support component 43 is shown mounted to the hand rest 18b of the right limb support 14b. It will be appreciated that the left 14a and right 14b limb supports may each be configured for individual user requirements and abilities. Depending on requirements, one or both limb supports 14a,14b may comprise hand grip or support devices such as joystick components or hemispherical shaped support components, but in some situations no hand grip or hand support components will be provided and the user's hand may simply rest in the hand rests 18a,18b of the limb supports.

Figure 9:
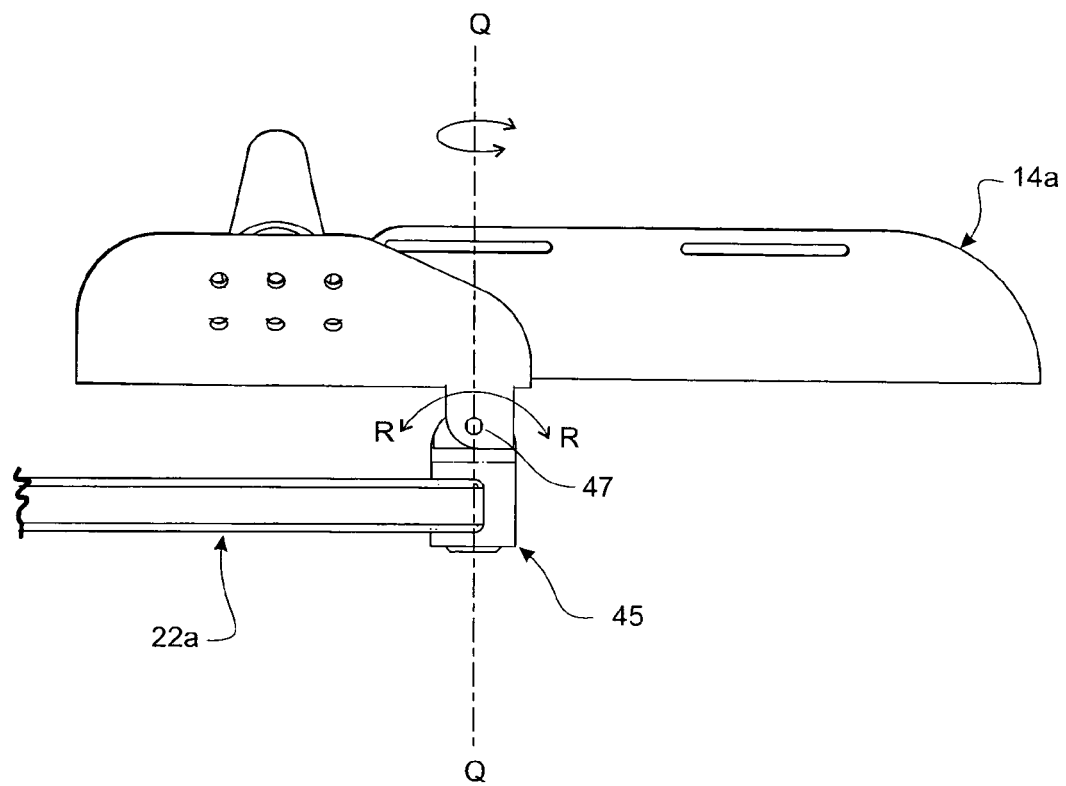
FIG. 9 shows an enlarged side elevation view of a left limb support of the exercise device of FIG. 3.

In this preferred form, each of the limb supports 14a,14b is arranged to have two degrees of freedom of movement relative to the ends of the left and right articulated linkage arms 22a,22b to which they are mounted and which will be described in more detail later. By way of example, FIG. 9 shows the left articulated linkage arm 22a and limb support 14a. The limb support 14a is mounted to the end of the left articulated linkage arm 22a by a swivel or pivotal mount 45 that allows the limb support to freely rotate about axis QQ. Additionally, the limb support 14a is pivotally coupled at point 47 by a pivotal coupling or pivotal connection to the swivel mount 45 to allow the limb support 14a to be pivoted about the pivot axis at 47 as shown by arrows RR. In this preferred form, the pivot axis 47 is substantially perpendicular to the rotation axis QQ of the swivel mount. This mounting system allows the limb support 14a to freely rotate or swivel about axis QQ with respect to the 2D movement plane and to also pivot or tilt into and out of alignment relative to the 2D movement plane for the user's comfort during use. In alternative forms, it will be appreciated that the limb supports 14a,14b may be fixed in a predetermined orientation and position to the end of their respective articulated linkage arms 22a,22b if desired, although this reduces the maneuverability of the limb supports 14a,14b.

It will be appreciated that the components of the limb supports 14a,14b may comprise suitable padding to ensure user comfort. Additionally, each limb support preferably comprises a strapping system having one or more straps extending around the forearm rest and/or hand rest that are fastenable to secure the user's forearm and/or hand in the limb support during use of the exercise device. By way of example, the straps may be formed from material that is looped around the limb support and secureable to themselves by a hook and loop fastening system, buckling system or similar. Primarily, the strapping system is provided for securing the affected or paralysed arm in its limb support, as the user's unaffected arm can be held in place in the limb support by the user gripping the hand grip device, although the strapping system can also be used on the limb support associated with the unaffected arm to assist in use of the exercise device if desired.

Reverting to FIGS. 3 and 4, in this first preferred form the support system for the limb supports 14a,14b comprises a pair of left and right articulated linkage arms 22a,22b. Each articulated linkage arm comprises an inner arm 24a,24b and outer arms 26a,26b. As referred to earlier, the limb supports 14a,14b are provided at or toward an end of the outer arms 26a,26b and are preferably moveably mounted as described with respect to FIG. 9. The opposite ends of the outer arms 26a,26b to the ends supporting the limb supports 14a,14b are pivotally coupled by pivotal connections 28a,28b to respective ends of the inner arms 24a,24b.

Figure 10:
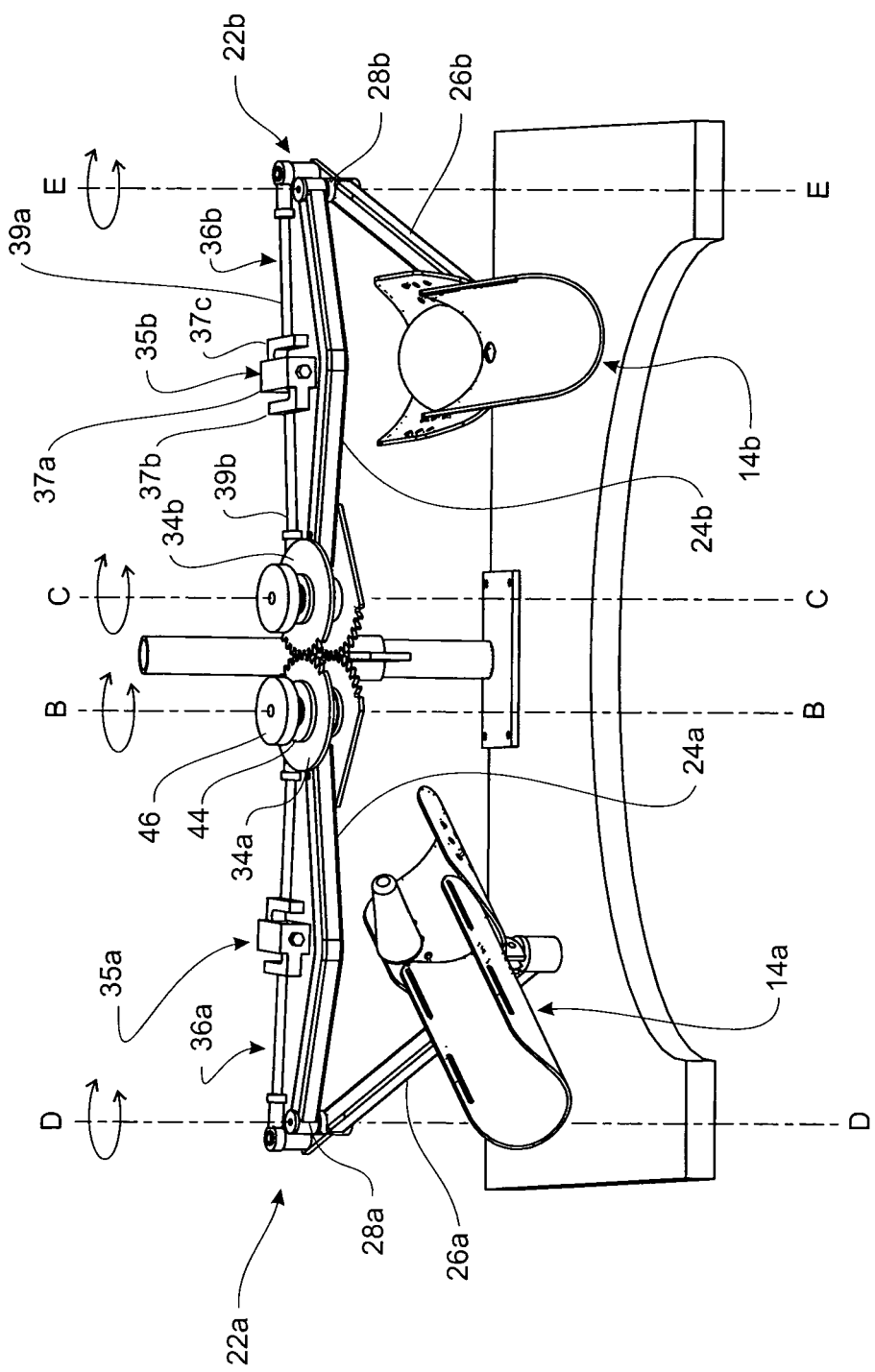
FIG. 10 shows a front perspective view of the exercise device of FIG. 3 without the main housing components so that the gearing system is visible.

Referring to FIG. 10, the articulated linkage arms 22a,22b each have two points of pivotal movements or pivot joints. The outer arms 26a,26b can pivotally rotate relative to respective pivotal axes DD,EE provided by the pivotal connections 28a,28b at the ends of the inner arms 24a,24b. The inner arms 24a,24b can pivotally rotate relative to their respective pivot axes BB,CC that are provided at the central main housing 12. In the preferred form shown, the outer arms 26a,26b are substantially straight, and the inner arms 24a,24b are slightly bent in the middle, although it will be appreciated that one or both arms may be straight, bent or otherwise shaped as desired.

Figure 11:
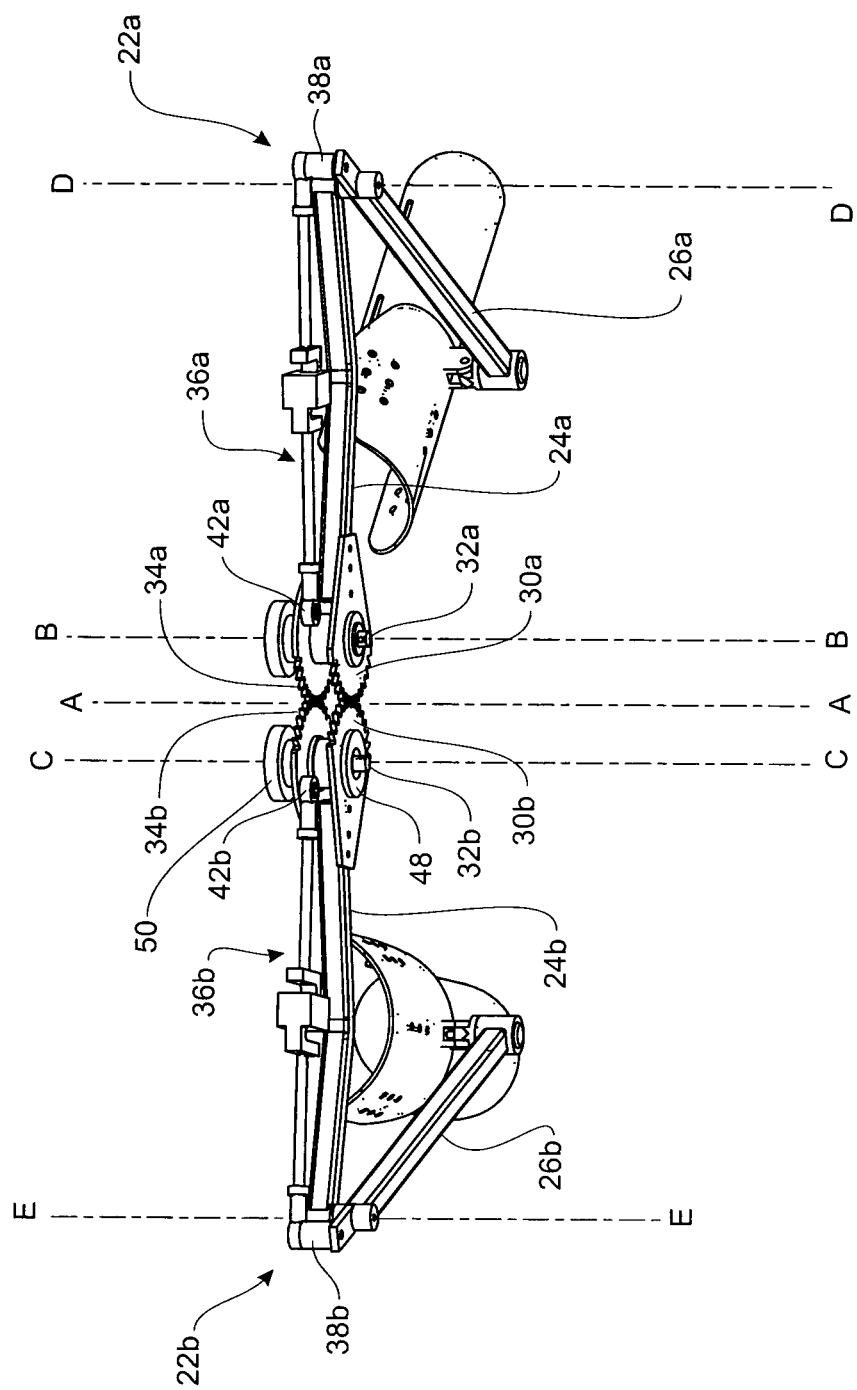
FIG. 11 shows a rear perspective view of the exercise device of FIG. 3 without the support or mounting structure and main housing components so that the gearing system is visible.

Referring to FIG. 11, the exercise device 10 comprises a mirroring mechanism that is operatively coupled to the limb supports and/or their support system such that movement of one limb support by a user causes or powers a corresponding mirrored movement of the other limb support relative to the line of symmetry AA. In the first preferred form, the mirroring mechanism comprises a gearing system provided in the central main housing 12 that is operatively coupled to the pivotal movement of both the inner and outer arms of the articulated linkage arms 22a,22b such that movement of either arm in the 2D movement plane causes a corresponding mirrored movement of the other arm relative to the line of symmetry.

The geared mirroring mechanism in this first preferred form of the exercise device comprises a first pair of gears 30a,30b that are each attached to or integrally formed with the end of a respective inner arm 24a,24b. The first pair of gears 30a,30b each comprise an aperture through which a spindle or shaft 32a,32b extends and which allow for rotation of the gears and thereby pivotal movement of the inner arms 24a, 24b about their respective pivot axis BB, CC that are formed by the shafts 32a,32b. The toothed periphery of the first pair of gears 30a,30b are arranged to mesh together at the line of symmetry AA. This results in pivotal movement of one inner arm causing a corresponding, and substantially equal, mirrored pivotal movement of the other inner arm via rotation of the gears in opposite directions.

A second pair of gears 34a,34b of the gearing system are also rotatably supported by the respective shafts 32a,32b that are fixed within the central main housing 12. In this preferred form, the first 30a,30b and second 34a,34b pairs of gears rotate about the same respective axes BB,CC in that their shafts are the same or co-aligned. A pair of connecting rods or rod assemblies 36a,36b operatively couple the second pair of gears 34a,34b to their respective outer arms 26a,26b via rod-end connectors. In particular, the outer ends of the connecting rods 36a,36b are pivotally coupled at respective pivotal couplings 38a,38b provided at an end of the respective outer arms 26a, 26b. The inner ends of connecting rods 36a, 36b are pivotally coupled at pivotal connection 42a,42b to the underside surface of the second pair of gears 34a, 34b. The toothed periphery of the second pair of gears 34a,34b also mesh together at the line of symmetry AA such that pivotal movement of the outer arms 26a,26b about their respective axes DD, EE is transferred via the connecting rods 36a,36b to rotate the gears 34a,34b. This results in pivotal movement of one outer arm 26a,26b causing a corresponding mirrored movement of the other outer arm in a similar manner to the first set of gears. In this preferred form, the first pair of gears 30a,30b is situated under the second pair of gears 34a,34b, but this arrangement may be reversed in alternative forms of the gearing-based mirroring mechanism if desired.

As will be explained in further detail later, the exercise device 10 may form part of an overall exercise system that may optionally include a balance sensing and feedback system. In this first preferred form, the exercise device may comprise one or more force or load sensors that are arranged to sense the force or load applied by the user's left and right limbs when moving the limb supports 14a,14b. By way of example and with reference to FIG. 10, the connecting rod assemblies 36a,36b may each be provided with one or more inline force or loadcell sensors 35a,35b that are configured to sense the load or force applied through the connecting rod 36a,36b during movement of the limb supports 14a,14b. It will be appreciated that the loadcells 35a,35b may be coupled inline with the connecting rod assemblies 36a,36b in various ways to sense and measure the work done by each of the left and right arms when the exercise device is in use. The loadcells 35a,35b may be configured to continuously or periodically generate representative load signals for subsequent processing, storage and/or display, as will be explained in further detail later.

Referring to the connecting rod assembly 36b in FIG. 10 by way of example, the loadcell 35b comprises a central main body 37a which houses the sensor electronic components, such as strain gauges, power circuitry and interface circuitry for connecting or transferring the sensed load signals to external devices. Extending from opposite sides of the main body 37a of the loadcell are substantially rigid but slightly flexible L-shaped connector components 37b,37c. In the preferred form, the rod assembly 36b comprises a first rod part 39a that extends between the outer arm 26b as explained previously and screw threads or is otherwise connected to connector component 37c of the load cell 35b. Similarly, the a second rod part 39b of the rod assembly 36b is coupled at one end to gear 34b as previously explained and at the other end is also screw threaded or otherwise connected to the other connector component 37b of the load cell 35b. In this configuration, the loadcell is arranged to sense the degree or level of flex of a beam connected between the two L-shaped connector components 37b,37c as the exercise device is used, and this provides a representation of the force or load applied by the user's left and right arms. It will be appreciated that other loadcell or force sensor arrangements may be integrated into the linkage arms and/or gearing system to assist in assessing the work being done by each of the user's arms during operation of the device.

In summary, the gearing system comprising the first and second set of gears results in two-dimensional movements of the articulated linkage arms 22a,22b supporting the limb supports 14a,14b to be mirrored relative to the line of symmetry AA. However, it will be appreciated that in this preferred embodiment the swivel and/or tilting movements of each of the limb supports 14a,14b relative to their respective articulated linkage arm is independent of the other limb support. It will also be appreciated that the swivel and/or tilting movements of each of the limb supports 14a,14b could be controlled to be dependent upon each other and the basic function of the exercise device 10 will not be substantially altered.

In this first preferred form, the exercise device 10 comprises one or more adjustable friction brakes or an operable braking or resistance system associated with the gearing system of the mirroring mechanism. The adjustable friction brakes are operable to apply a varying degree or level of resistance to rotation of the gears and thereby resist movement of the articulated linkage arms in the 2D movement plane. In operation, this enables a therapist or clinician to apply a desired amount of resistance to movement of the limb supports. In the preferred form, adjustable friction brakes are provided for the first set of gears 30a,30b and second set of gears 34a,34b independently such that resistance can be independently applied to the desired degree to either the pivotal movement of the inner arms 24a,24b and/or the pivotal movement resisting the outer arms 26a, 26b. This is useful functionality for the therapist as the inner arms 24a,24b tend to mostly allow for forward and back movement of the user's arms in the direction of the Y-axis of the 2D movement plane, and the outer arms 26a,26b tend to mostly allow side-to-side movement of the user's arms in the direction of the X-axis of the 2D movement plane, so particular movements and associated muscle groups can be targeted during training.

In this preferred form, the adjustable friction brakes are provided in the form of friction plates that are arranged to contact and engage, with adjustable degrees of pressure, an upper or lower surface of at least one gear of each pair of gears. Referring to the left linkage arm 22a in FIG. 10, friction plate or brake pad 44 is provided on the upper surface of the left-hand gear 34a of the second pair of gears 34a,34b and has an associated operable brake tensioner or knob 46 that may be screw-turned to increase or reduce the amount of pressure applied by the brake pad 44 to the gear and thereby the overall resistance applied to pivotal movement of the outer arms 26a,26b. Referring to the right linkage arm 22b in FIG. 11, a friction plate or brake pad 48 is provided on the underside of the right-hand gear 32b of the first set of gears 32a,32b and has an associated operable brake tensioner or knob 50 that may be screw-turned to increase or reduce the pressure applied by the brake pad 48 to the underside of the gear 32b to vary the resistance applied to pivotal movement of the inner arms 24a, 24b.

Figure 12:
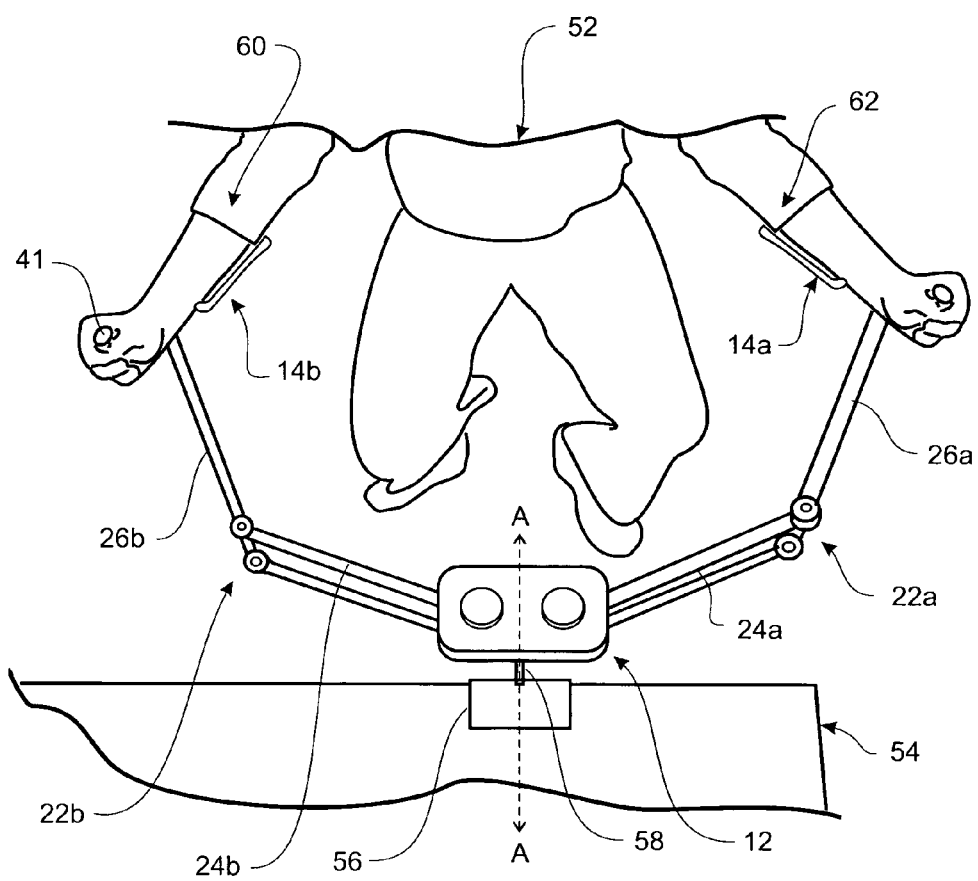
FIG. 12 shows a top plan view of a first preferred form exercise device of the type shown in FIG. 3 but fixed to the edge of a table and in use by a user.
Figure 13:
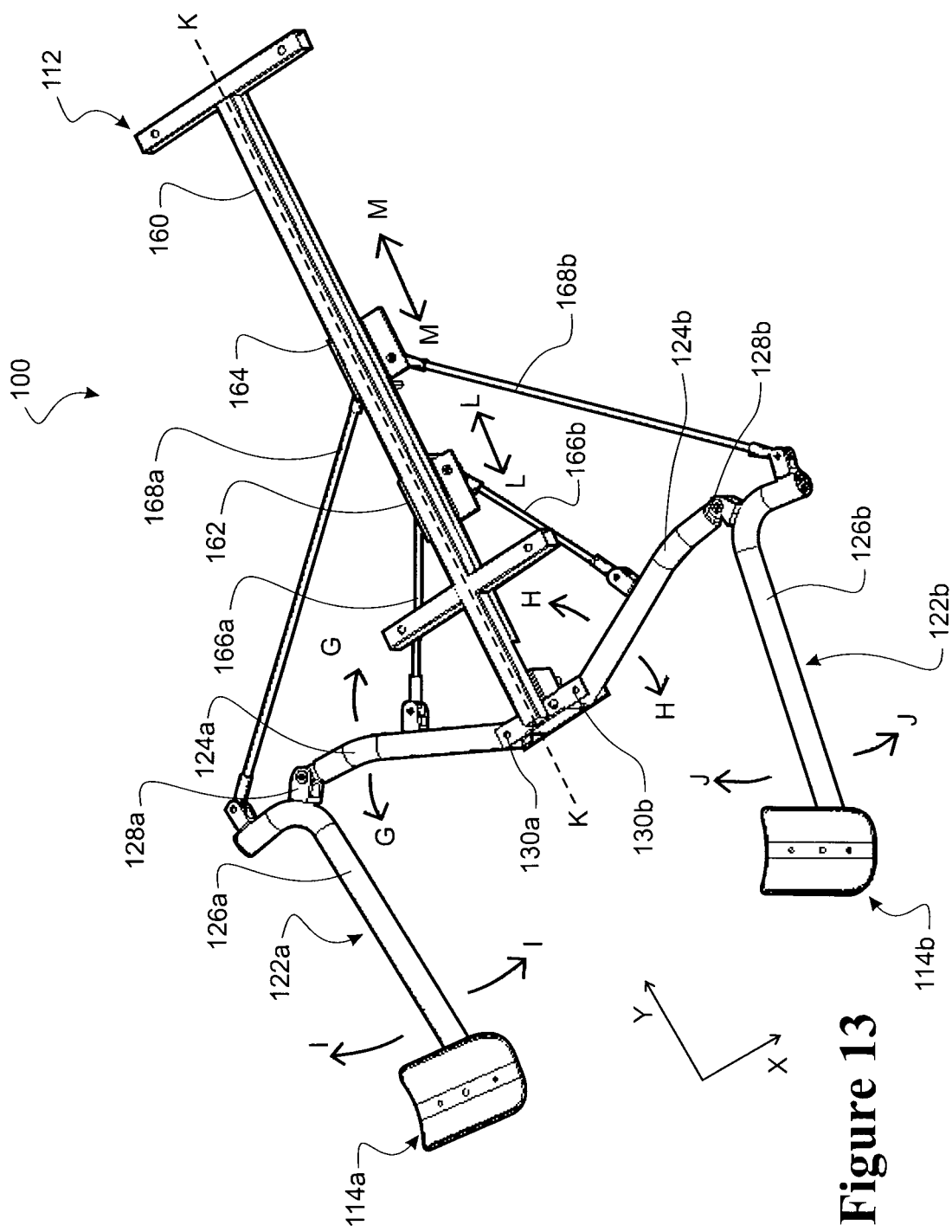
FIG. 13 shows a top-side perspective view of a second preferred form of the bilateral upper limb exercise device of the invention.

Referring to FIG. 12, operation of the first preferred form exercise device by a user 52 will now be explained. In the preferred form of operation, the user 52 sits or stands directly in the front of the exercise device. As mentioned, the central main housing 12 is mounted to a fixed structure or surface. In this example, the main housing 12 is clamped directly to the edge of a table 54 by a clamping mechanism 56 from which a cantilevered support member 58 extends and fixes to the main housing 12. The user 52 in this example aligns the center of their body substantially with the central line of symmetry AA of the exercise device. In this example, the user has an unaffected right upper limb or arm 60 and a paralysed or at least partially paralysed left arm 62. The user 52 places their right forearm into the right limb support 14b and grips the joystick handgrip 41 with their right hand. Optionally, the user may also fasten securing straps (not shown) to secure their right forearm and/or hand in the limb support 14b. Likewise, the user 52 with the assistance of a therapist or clinician places their left affected arm in the left limb support 14a, or alternatively, the user 52 may use their right arm to firstly place their paralysed left arm 62 into the limb support 14b before placing their right arm 60 into the right limb support 14b. In the preferred operation, the user or clinician fastens one or more securing straps 64 around the user's left forearm and/or hand to secure the paralysed limb to the limb support 14a.

With both arms 60 and 62 now supported within their respective limb supports 14a, 14b, the user may carry out repetitive pre-determined or random forward and back, or side-to-side, movements or a combination of both in the 2D movement plane with the right arm 60 and via the mirroring mechanism of the exercise device the left paralysed arm 62 will be carried in a corresponding mirrored movement. In effect, the mirroring mechanism copies movement of the unaffected upper limb onto the paralysed limb and this can be used in neuroplastic retraining rehabilitation.

Second Preferred Form of the Exercise Device

Referring to FIGS. 13-16, a second preferred form of the exercise device 100 will now be explained. The functionality and operation of the second preferred form of exercise device 100 is substantially similar to that of the first preferred form exercise 10 from the user's perspective. Like the first preferred form exercise device 10, the second preferred form exercise device 100 comprises left and right limb supports 114a, 114b supported by respective articulated linkage arms 122a,122b. The features of the limb supports 114a,114b may be similar to those features of the limb supports 14a,14b of the first preferred form exercise device 10. As to the articulated linkage arms 122a,122b, these are also similar in that they have inner 124a,124b and outer 126a,126b arms that are pivotally coupled at pivotal connections 128a,128b. Again, the limb supports 114a, 114b may be pivotally mounted, with one or multiple degrees of freedom, to the ends of the outer arms 126a,126b. The inner arms 124a,124b may be pivotally mounted to the base support 112 at pivotal couplings 130a, 130b.

In operation, the limb supports 114a,114b can be moved with two degrees of freedom in a 2D movement plane (represented by the X-Y plane). As with the first preferred form, the inner arms 124a,124b can pivot back and forth as shown in direction GG, HH about pivot points 130a,130b to allow substantially forward and backward motion of the limb supports in the Y direction of the 2D movement plane. The outer arms 126a,126b can pivot back and forward in directions II, JJ about respective pivot points 128a,128b to thereby allow substantially side-to-side movement in the X direction of the 2D movement plane.

The fundamental difference between the first preferred form and second preferred form exercise devices is in relation to the mirroring mechanism that copies 2D movements of one arm to the other arm. In the second preferred form exercise device 100, a slider-based mirroring mechanism is utilised. In this preferred form, the base support 112 comprises a frame having an elongate slider track 160 along which a first slider 162 and a second slider 164 are mounted for slidable movement back and forth along the slider track 160. The first slider 162 is operatively coupled to both inner arms 124a,124b via respective connecting rods 166a,166b. In particular, the connecting rods 166a,166b are pivotally coupled at each end to their respective inner arms 124a,124b and the first slider 162 via rod-end connectors. Likewise, the second slider 164 is operatively coupled via connecting rods 168a,168b to the outer arms 126a,126b. In particular, the connecting rods 168a,168b are pivotally coupled at each end to their respective outer arms 126a,126b and to the second slider 164 via rod-end connectors.

In operation, the first slider 162 acts to mirror pivotal movement of the inner arms 124a,124b, such that pivotal movement of one of the inner arms causes slidable movement of the first slider 162 backward or forward along the slider track is shown by arrows LL thereby causing a corresponding pivotal movement of the other inner arm. Likewise, the second slider 164 acts to mirror the movements of the outer arms 126a,126b, in that pivotal movement of one of the outer arms causes a slidable movement backward or forward in direction MM of the second slider 164 on the slider track 160 thereby causing a corresponding pivotal movement of the outer arm.

Figure 14:
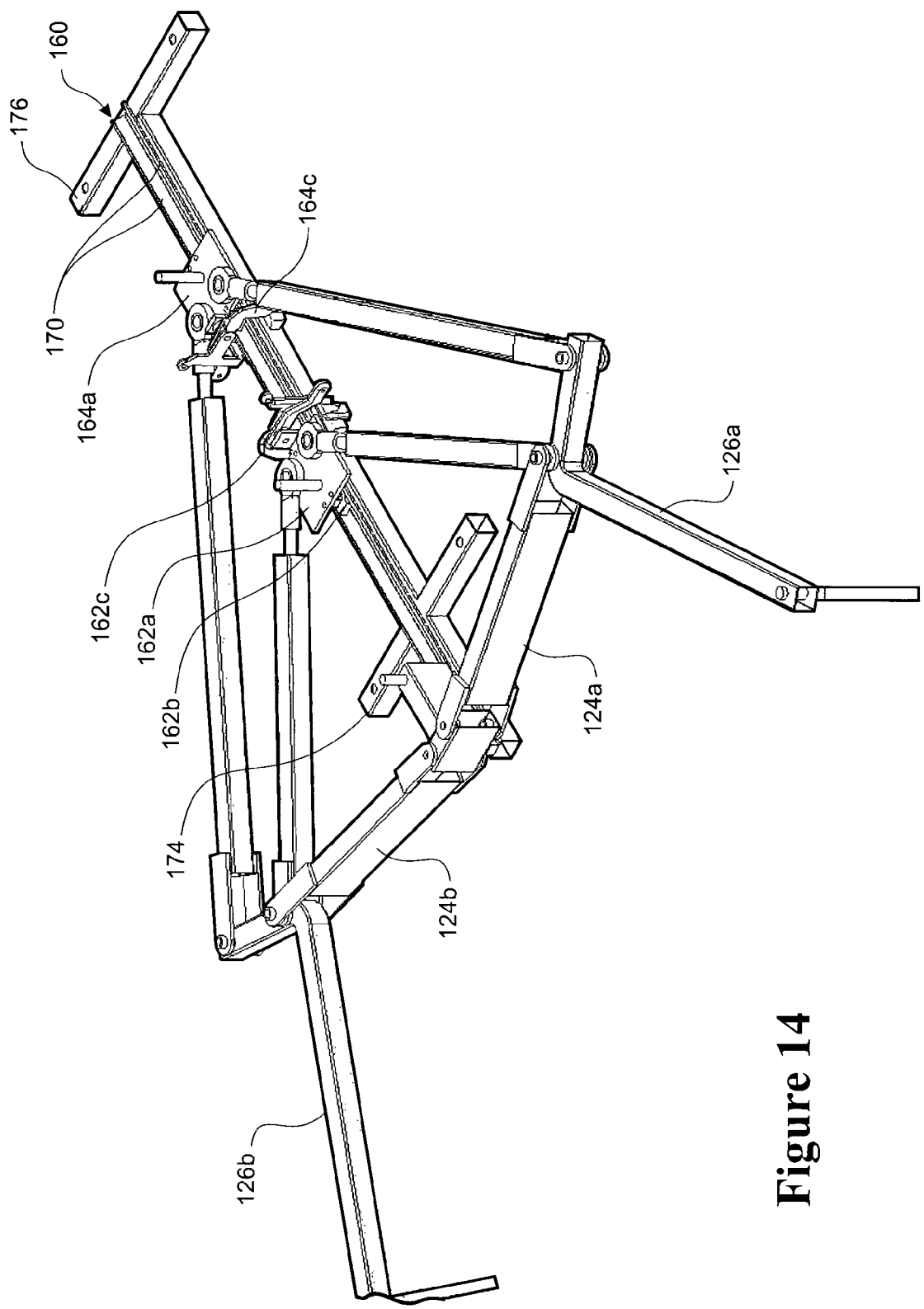
FIG. 14 shows an underside perspective view of the exercise device of FIG. 13.

Referring to FIG. 14, the slider track 160 comprises a parallel set of slider rails 170. Each slider 162,164 comprises a plate 162a,164a from which a linear slider block extends and slidably engages for slidable movement between the slider rails 170 of the slider track 160. The slider block 162b can be seen for the first slider 162. It will be appreciated that any other slider and slider track arrangement could alternatively be utilised if desired.

Figure 15:
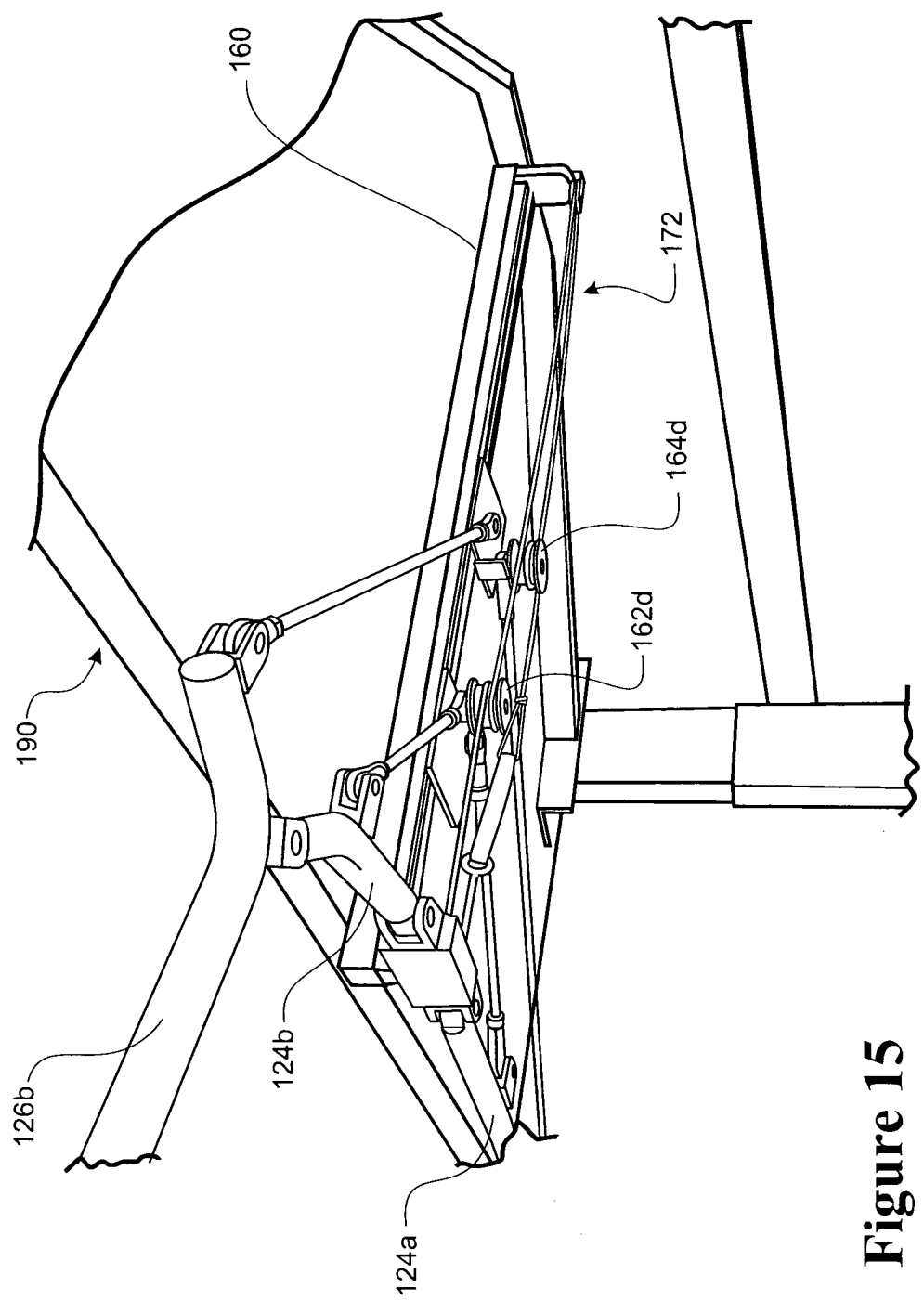
FIG. 15 shows an underside perspective view of the exercise device of FIG. 13 clamped to the underside of a table ready for use and a pulley-based adjustable friction brake system.

In this second preferred form, the exercise device 100 comprises an operable braking or resistance system having one or more adjustable friction brakes for one or both sliders 162,164. In particular, the adjustable friction brakes may be adjusted to independently control and apply increased or reduced resistance to pivotal movement of either of the inner 124a,124b or outer 126a,126b arms supporting the limb supports 114a,114b. In one form, each slider 162,164 may carry or have a fixed mounted brake caliper 162c, 164c that is operable to clamp to the outside of the slider track 160 with varying degrees of pressure to thereby increase or decrease resistance to slidable movement of the sliders 162,164 along the slider track and thereby the respective pivotal movements of the articulated linkage arms. In an alternative form, the adjustable friction brakes may comprise non-rotating pulleys 162d and 164d mounted or carried by the respective sliders 162, 164, as shown in FIG. 15. A tensioning table or rope 172 may be wrapped around the pulleys and the tension on the cable can be adjusted to thereby increase or decrease resistance to slidable movement of the sliders 162,164 back and forth along the track 160 and thereby increase or reduce resistance to pivotal movement of the articulated linkage arms.

Reverting to FIG. 14, the frame of the base support preferably comprises cross-members 174 and 176, each having one or more apertures through which fastening bolts or screws may extend through and into a fixed surface or structure for mounting of the exercise device. Alternatively, the slide track 160 may be directly fixed to a desired surface or structure, such as the underside of table 190, as shown in FIG. 15 for mounting and supporting the exercise device. It will be appreciated that other fixing structures or mounting arrangements could alternatively be used if desired, including clamping mechanisms or the like.

Figure 16:
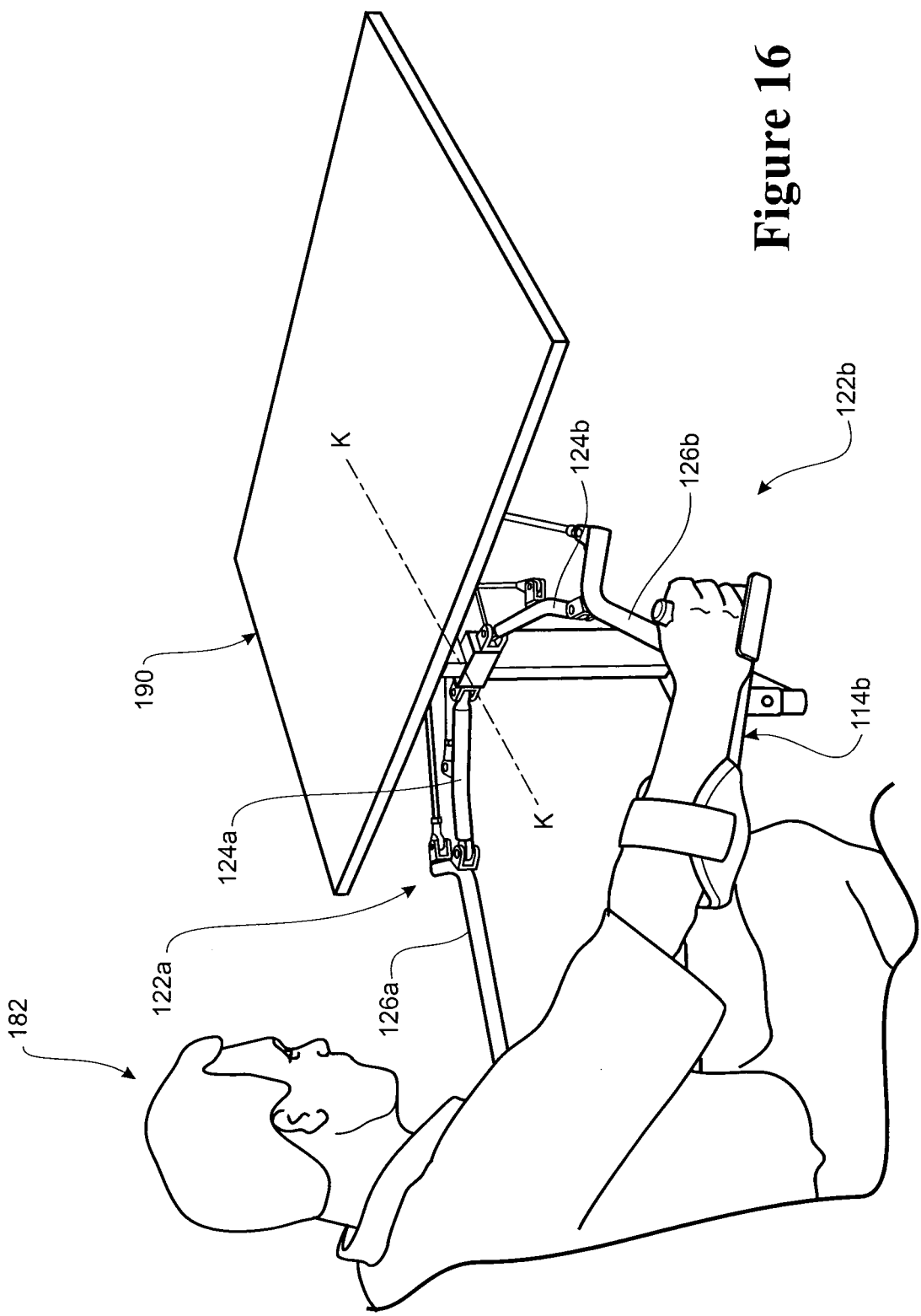
FIG. 16 shows a top-side perspective view of the exercise device of FIG. 13 in use by a user.

Referring to FIG. 16, an explanation of operation of the second preferred form exercise device 100 will be explained. The operation of the exercise device 100 is the same as that described in regard to the first preferred exercise device 10 with respect to FIG. 12. For example, the exercise device is fixed to the underside of a table 190 and a user 182 sits in front of the table and places each arm in a respective one of the left and right limb supports 114a,114b (only one visible). As before, the user may secure their paralysed or affected arm in the limb support by the fastening straps of the securing system provided on the limb support and optionally may also use fastening straps on the limb support for their normal or unaffected arm if desired. A therapist can also assist in the securing the arms within the limb supports.

The center line of the user's body is preferably aligned substantially with the line of symmetry KK of the exercise device 100. The user then proceeds to exercise or train on the device by moving their unaffected arm in the limb support within the 2D movement plane, including side-to-side, and forward and back movements, or combinations of the two in either a repetitive pre-determined pattern or random pattern. It is preferable to have the exercises goal-directed. The clinician may set a series of physical targets for the patient to move towards, or a computer control system can be utilized to direct the movements through a game-play scenario, as will be explained further below. Via the mirroring mechanism, the articulate linkage arm carrying the paralysed arm undergoes corresponding mirrored movements such that the paralysed arm is carried to aid neuroplastic retraining rehabilitation.

It will be appreciated that the balance sensing and feedback system described with respect to the first preferred exercise device 10 may also be incorporated into the second preferred form exercise device 100.

Materials and Components for the Exercise Devices

It will be appreciated that the components of the exercise devices 10, 100 may be formed from various materials, including metals, aluminum, alloys, plastic, carbon fibre, or any other suitable material. By way of example, the articulated arms may comprise elongated tubes having a substantially circular cross-section, but alternatively square or any other cross-sectional shape can be used. In addition, the articulated arms and various frame components may be hollow or solid depending on structural requirements. The components can be pre-formed or molded for example with plastic, or shaped and produced in other ways.

Tilting Mechanism

As described with respect to the first preferred form of the exercise device 10, the mounting structure for the device may comprise an adjustable tilting mechanism that is operable by a user to tilt the orientation of the overall exercise device such that the orientation of the 2D movement plane relative to the horizontal can be altered to increase or reduce difficulty of exercises performed on the device. For example, the clinician may tilt the exercise device such that the 2D movement plane is on an incline relative to the horizontal to increase difficulty for the patient when performing the various exercises. By way of example, the tilting mechanism may comprise a stepped pivoting or hinging mechanism that can be locked or latched at a range of tilting angles as previously described. It will be appreciated that a tilting mechanism may also be incorporated into the second preferred form exercise device 100.

Three-dimensional Movement Embodiments of the Exercise Devices

In some forms, the articulated linkage arms of exercise devices may be allowed to have a third degree of movement. These three-dimensional (3D) embodiments of the exercise device are configured to allow the articulated linkage arms to move freely up and down in a substantially vertical or perpendicular direction relative to the 2D movement plane. For example, the tilting mechanism of central main support 12 of the exercise device 10 may be unlocked to allow free pivotal movement of the entire exercise device about the mounting system to thereby enable each of the articulated linkage arms and associated limb supports to have a third degree of freedom of movement in the vertical direction or in a direction substantially perpendicular to the 2D movement plane. In such forms, the weight of the exercise device may be counterbalanced so that the user does not need to lift the weight of the device when moving their arms vertically. This capability allows the user to perform up and down vertical lifting or lowering hand and/or arm movements in addition to movements in the 2D movement planes such as side-to-side and back and forth movements. In this situation, the vertical movements are also mirrored across the line of symmetry, as the entire device moves in the vertical direction. In effect, the user is able to move their arms freely within a 3D movement space, the boundaries of which are defined by the construction of the exercise device. It will be appreciated that the third degree of vertical movement may alternatively be provided via other modifications of the mounting system, such as the use of a hinging mechanism or the exercise device may be freely slidable up and down mounting pole 17 in the case of the first preferred form of exercise device 10.

Exercise System Examples

As mentioned earlier, the exercise device may form part of an overall exercise system that is designed to motivate the user to perform and train on the exercise device for an extended period of time to enhance the rehabilitation progress.

Referring to FIGS. 1 and 2, preferred embodiments of the exercise system comprise a bilateral upper limb exercise device 202, such as either exercise device 10 or 100 described, and additionally a position tracking system 210 that is arranged to sense and track movement of one or both of the limb supports of the exercise device and generate positional data relating to their 2D and/or 3D movements and/or position of the limb supports in the 2D movement plane or 3D movement space. The position tracking system 210 preferably comprises an interface for transmitting the position data to an interactive gaming system 212 to enable user interaction with the gaming system. For example, the positional data may be used as input to control an interactive game displayed on a output display or visual display unit. In one form, the interactive gaming system 212 may be in the form of a computer system 302 upon which an interactive game runs. The game may be presented on an output display 222, such as a computer monitor, LCD screen or the like, so as to enable the user to play the game via movement of the limb support(s) of the exercise device. In one form, movement of one or both limb supports act like a computer mouse input such that they move a cursor on the output display 222 in order to interact with the game. In another form, the interactive game may be provided in a virtual reality or augmented reality environment that the user can interact with. In this form of interactive gaming, the user's actual arms and/or hands or graphical representations may be reproduced in real-time on the output display to interact with the environment to perform tasks. In effect, one or both articulated linkage arms and/or limb supports act as computer input devices enabling the user to interface with an interactive game and thereby motivating the user to exercise for extended periods of time via entertainment from the game. It will be appreciated that the computer system may not necessarily only provide games, but may have other applications that the user may interact with and perform tasks via movement of their arms. It will be appreciated that buttons, switches or dials may be incorporated into the limb supports for assisting the user to interact with the game or application on the computer system in addition to movement of the position of the limb supports in the 2D movement plane by their arms.

While the position tracking system 210, interactive gaming system 212, and balance sensing and feedback system 228 are shown as separate components and systems, it will be appreciated that these systems may be integrated with each other as desired. In one form, all these systems may be integrated into a single hardware platform or system. In other forms, the systems may be separate and may interact and communicate with each other over wired or wireless mediums as necessary.

The interactive gaming system may have a data logging functionality that enables a clinician to monitor their patient's arm movements and calculate the amount of movement and the improvements over time, with storage of this data in a memory module. This could be modeled to provide a clinical assessment that is remotely reported to the physiotherapist for a full telerehabilitation system that does not require a clinician on-site.

As mentioned, the exercise device may interface with a purpose built rehabilitation computer system with a training computer game, but alternatively the exercise device may be interfaced with other video games and gaming consoles. In particular, the positioning data from the position tracking system can be interfaced with gaming consoles so as to allow the user to play the games via the limb support movement, which takes the place or augments a gaming controller, joystick, or the like.

Example Interactive Games

By way of example only, some examples of possible interactive computer games will be described, but it will be appreciated that there are a range of different types of games that could be used in the exercise system.

Line-Tracing Game

Figure 17:
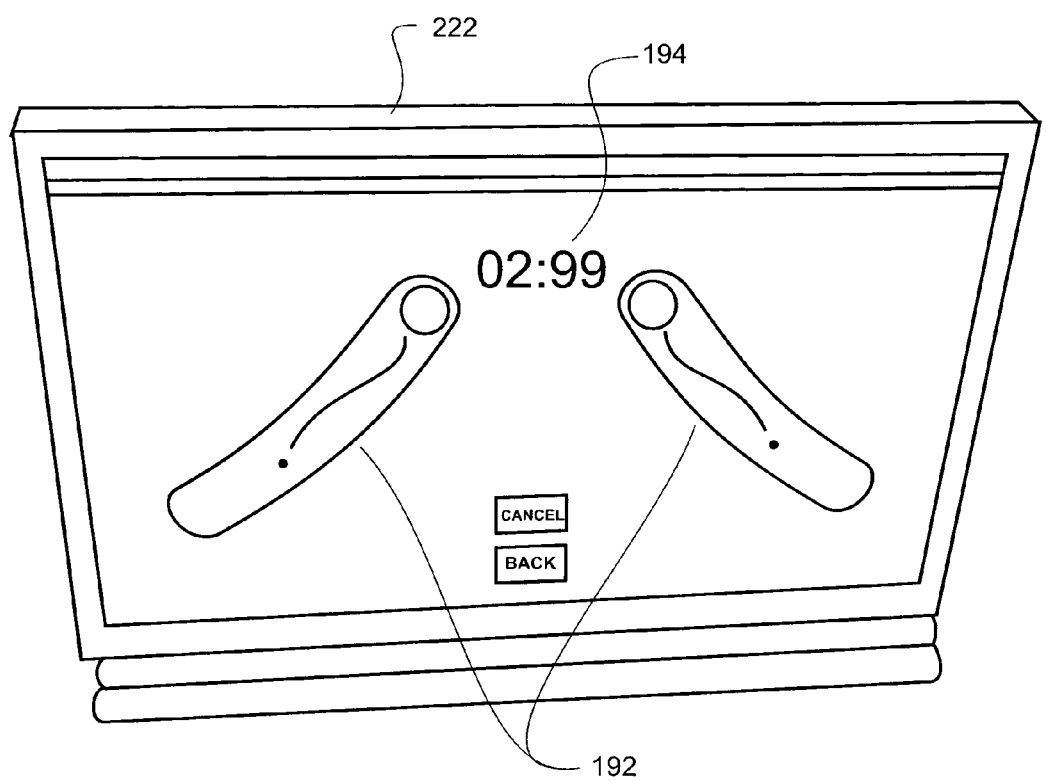
FIG. 17 shows a visual display unit of an interactive gaming system of an overall exercise system in accordance with an embodiment of the invention, and in particular a tracing game that may be played by a user of the exercise device via movement of their limbs.

With reference to FIG. 17, an example training interactive user-game is shown on the output display 222. The game is a "bilateral" computer game comprising a slightly curved target line 192 that is being traced in a down and outwards motion. The game includes a timer module that counts the time required to achieve the tracing task and this is shown in a timer-display 194 in the centre of the display 222. A score module (not shown) is also included in the game to score the accuracy of the user as they attempt to trace the target line 192 via movement of the position of the limb supports of the exercise device in the 2D movement plane as the game input device or cursor input. Preferably, a score display (not shown) is provided on the output display 222 and will display the calculated game score once the task is completed. It will be appreciated that the score may be based on various weighted factors, including accuracy, speed, difficulty etc. The game may include a memory module that is arranged to store the user's scores and a progress graph with the various line difficulties, or levels, is available.

The computer game will encourage the patient to perform therapeutic exercises appropriate to their stage in rehabilitation from neurological injury. The computer game will set goal-directed tasks to encourage neuroplastic recovery from the neurological injury. For example, at an early stage of the therapy the tasks may be straight line tracing with the target lines being in a direction that the patient can easily achieve, given their level of injury or disability. As the treatment progresses, the computer can modify the target lines so that they are harder for the patient to achieve. For example, the lines can be in difficult directions or may be curved. In one example, the computer game could be arranged to present the medical clinician with a library of target lines and in this manual mode they can choose appropriate lines according to the patient's abilities. Additionally or alternatively, the computer can be set into an automatic mode in which it is programmed to automatically extend the patient's treatment by gradually and progressively introducing more complex target lines and shapes that must be traced.

The computer can provide the user with a score of their success based on, but not limited to speed, accuracy and difficulty of line following. Such scoring encourages users to extend their efforts and exercise to greater levels than they otherwise would.

It will be appreciate that the computer game can be programmed to encourage the user to perform a useful therapeutic exercise rather than creating random movements. Such exercises could initially be easy for a person with hemiparesis to perform. For example, initially straight line tracing used and this can gradually become more difficult as the rehabilitation progresses into complex curved line tracing. In addition, the game can become progressively harder without the patient realising that it is happening and thereby push them to exercise to their limits. This can be achieved by extending the reach required to achieve the task target line set by the computer. The limb movement limits can also be measured and calculated by a measurement module and again intensity reduced if necessary.

Augmented Reality Game

Figure 18:
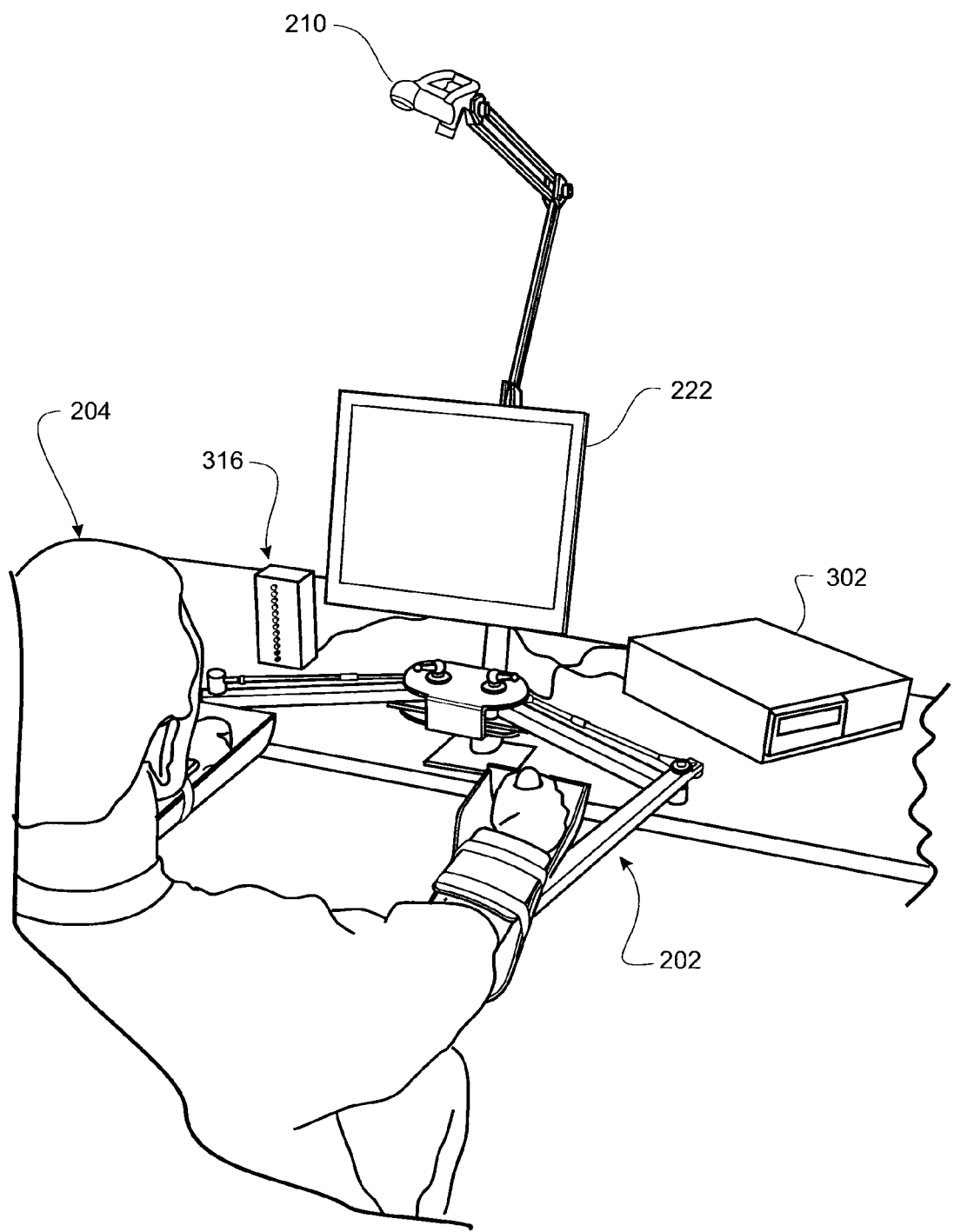
FIG. 18 shows a perspective view of an overall exercise system in accordance with an embodiment of the invention and which is being operated by a user.

Referring to FIG. 18, an exercise system of the form described with respect to FIG. 2 is shown. In this exercise system, the user 204 sits in front of and operates the limb supports of a bilateral upper limb exercise device 202 of the type described in respect of the first preferred form exercise device 10. The interactive gaming system is in the form of a personal computer 302 having an output display 222. In this exercise system, the position tracking system 210 is an optical system that comprises a camera, such as a webcam, that is positioned above the exercise device and configured to capture continuous video images of one or both limb supports of the exercise device as they are moved by the user within the 2D movement plane or a portion of that plane. The interactive game running on the personal computer 302 is in the form of an augmented reality environment in which the real-time video images of the limb support(s) of the exercise device in the 2D movement plane are presented on the output display 222. An interactive graphical game is provided as an overlay on the video images. In operation, the position tracking system and/or gaming software processes the video images and tracks their movement of the limb supports in the 2D movement plane to generate representative positional data. This positional data is used as input for enabling the user to interact with the game overlay by moving their arms in the 2D movement plane to perform the game tasks. It will be appreciated that the position tracking system only needs to track movement of one of the limb supports as the other limb support movement is mirrored.

Depending on the clinical decisions for the individual user or patient it may be preferable for the camera to be focused on the affected or partially paralysed limb, so that the virtual reality system provides the user with the sense that their affected limb is achieving the task within the computer game, even though it is possible that the unaffected or normal limb is generating the effort to move the affected limb. This sense of movement of the affected limb is thought to be beneficial in terms of neurological rehabilitation.

Example Position Tracking Systems

The position tracking system 210 may come in various forms for continuously sensing and tracking movement of one or both limb supports in the 2D movement plane, including external tracking systems and integrated tracking systems.

As for external position tracking systems, an example was described with respect to the exercise system in FIG. 18. For example, the positioning tracking system may utilise machine vision technology via one or more optical sensors, such as cameras, that are arranged to track the movement of the limb supports and generate the positional data relating to the position and/or movement of the limb support or target in the 2D movement plane using image processing software. It will be appreciated that the image processing software can be arranged to process continuous images of the 2D movement plane or a portion of that plane within which one or both limb supports are moving, and track movement of a part of the limb support or other associated target. For example, image processing software could be arranged to track a user's hand or any suitable type or powered or non-powered marker, target, or beacon that is mounted to the limb support or the user's hand. It will be appreciated that infrared based optical tracking systems may be used in which infrared markers emitting infrared light may be mounted to the limb support or user's hand for tracking by an optical sensor.

As for integrated position tracking systems, movement sensors may be provided in the exercise device to sense, directly or indirectly, the angular movement at the main pivot joints of the articulated arms and generate representative angle signals or data for sending to a position processing algorithm. For example, with reference to the first preferred form exercise device 10, movement sensors such as potentiometers and/or rotary encoders may be provided in either the gearing system or each of the main pivot joints 28a,28b and 42a,42b of the articulated linkage arms 22a,22b for sensing pivotal movement at generating angle signals representing the angular pivotal movement at the joints during movement of the articulated arms by the user. It will be appreciated that the positional data relating to the position of the limb supports in the 2D movement plane may be derived by the position processing algorithm from the pivot angle signals by virtue of knowledge of the dimensions of articulate linkage arms and geometric algebra.

As mentioned, the position data is used as input for interacting with the gaming system. By way of example, the position data may be in the form of X-Y co-ordinate data relating to the position of a limb support with reference to the 2D movement plane. It will be appreciated that the 2D movement plane reference may be calibrated and configured at the start of an interactive gaming session. Alternatively, any other suitable form or format of position data may be utilised to convey the position of the limb supports in the 2D movement plane.

It will be appreciated that the position tracking system, whether integrated with the exercise device or external, may transmit the movement data to the gaming system, such as a personal computer via wireless transmission, such as using Bluetooth or another wireless transmission protocol or system, or alternatively the position tracking system may be hardwired to the interactive gaming system.

Balance Sensing and Feedback System

As mentioned, the exercise system may optionally comprise a balance sensing and feedback system 228 that is arranged to continuously monitor load or work applied by the user's left and right arms when moving the respective limb supports of the exercise device in use.

Figure 19:
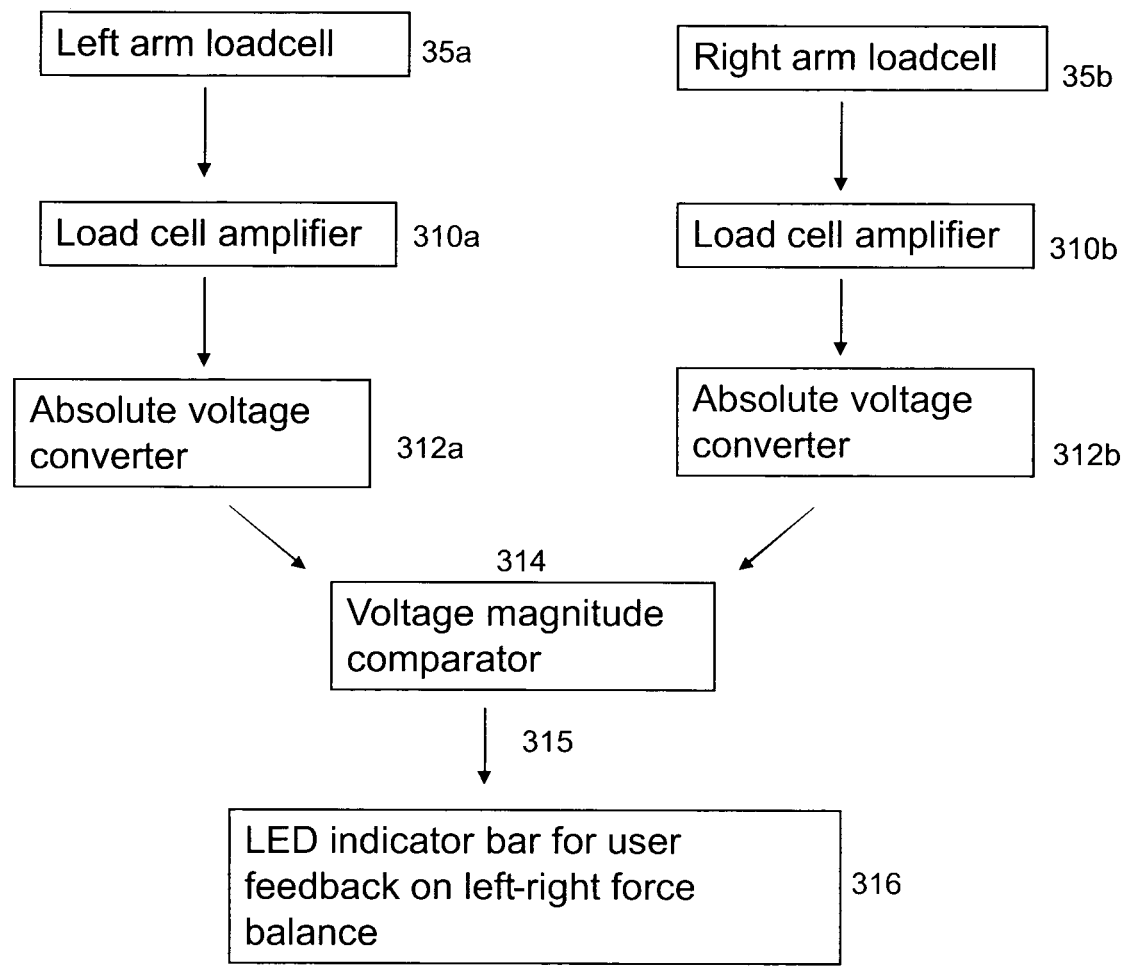
FIG. 19 shows a flow diagram of the operation of a balance sensing and feedback system operating with the exercise devices in some embodiments of the invention.

By way of example and with reference to exercise device 10 as shown in FIG. 10, the preferred form of balance sensing and feedback system 228 comprises left 35a and right 35b loadcells or force sensors in the connector rod assemblies 36a,36b associated with the articulated linkage arms 22a, 22b. The output signals from the load cell sensors are then either directly fed back to the user and/or their clinician or otherwise processed and fed back. In the preferred form, the left and right loadcell signals are compared to each other and the difference is ascertained and fed back to the user so as to provide an indication of the balance of the load and work being undertaken by the left and right arms. For example, referring to FIG. 19, a preferred form of balance sensing and feedback system configuration is shown. The loadcell voltage signals from loadcells 35a,35b are amplified by amplifiers 310a,310b and then converted to absolute voltage signals at convertors 312a,312b. A voltage magnitude comparator 314 is then utilised to compare the difference between the voltage signals and the difference signal 315 generated provides an indication as to the balance of the system in use and whether one arm is doing more work than the other arm.

In one form, the difference voltage signal 315 is displayed on a LED indicator 316 having different colored LED zones representing different levels of balance, as shown in FIG. 18. By way of example, there may be a series of green LEDs followed by a series of orange LEDs and finally a series of red LEDs. The green zone LEDs represent a small difference signal 315 (i.e. balanced), the orange LED zone represents a medium difference signal (slightly unbalanced), and the red LED zone represents a large difference signal and an extremely unbalanced exercise system, i.e. one arm is doing much more work than the other. This type of feedback can be useful to the user and clinician as they can try and maintain a balanced workout by maintaining the LED indicator 316 in the green zone during use of the exercise device. The balance sensing and feedback system is preferably arranged to continuously sense and feedback the balance of the system in real time. It will be appreciated that the loadcell signals and balance data may be presented to the user in other ways, including numerically, graphically, including presentation on an electronic display.

It will be appreciated that the balance sensing and feedback system may be integrated with the gaming system and the balance feedback data may be displayed on the output display of the interactive gaming system rather than needing a separate feedback indicator. It will also be appreciated that the number and complexity of the load cells and force sensors integrated into the exercise device may be expanded or altered to detect other desired forces and work being performed in particular directions to assist the user and clinician to assess the rehabilitation progress. Also, work being performed by the left and right arms can be assessed independently without reference to comparing them for balance if desired.

In summary, this invention provides a bilateral exercise in a two dimensional plane, or optionally a 3D space, which allows the user to interface with a computer or "video game" and thereby increase their attention and "goal direction" through the interaction with the computer task or game.

The foregoing description of the invention includes preferred forms thereof. Modifications may be made thereto without departing from the scope of the invention as defined by the accompany claims.

The invention claimed is:

1. A bilateral upper limb exercise device for exercising a user's arms, comprising:
 a central mounting structure that is mountable to a fixed surface or structure;
 left and right limb supports for supporting a forearm and/or hand of a respective arm of the user;
 a pair of articulated linkage arms that are pivotably coupled to opposite sides of the central mounting structure and which are arranged to support a respective limb support for translational movements in at least two degrees of freedom, including back-and-forth and side-to-side movements, within two-dimensional (2D) movement plane that is common to both limb supports; and
 a mirroring mechanism that is operatively coupled to the articulated linkage arms such that movement of one limb support by a user causes a corresponding mirrored movement of the opposing limb support relative to a central line of symmetry of the device.

2. A bilateral upper limb exercise device according to claim 1 wherein each articulated linkage arm comprises an inner arm and an outer arm that are coupled together at one end by a pivot joint, and wherein the inner arm is pivotally coupled to the central mounting structure at its other end and the outer arm being arranged to support its respective limb support at or toward its other end.

3. A bilateral upper limb exercise device according to claim 2 wherein each limb support is pivotally mounted at or toward an outer end of the outer arm of its respective articulated linkage arm.

4. A bilateral upper limb exercise device according to claim 3 wherein each limb support is pivotally mounted to the outer arm of its respective articulated linkage arm such that the limb support can freely rotate at or toward the end of the outer arm with respect to an axis that is substantially perpendicular to the 2D movement plane.

5. A bilateral upper limb exercise device according to claim 3 wherein each limb support is pivotally mounted to the outer arm of its respective articulated linkage arm such that the limb support can freely tilt into or out of alignment with the 2D movement plane.

6. A bilateral upper limb exercise device according to claim 1 wherein the limb supports are fixedly mounted in position and orientation on their respective articulated linkage arms.

7. A bilateral upper limb exercise device according to claim 1 wherein each limb support comprises a forearm rest that is arranged to support a user's forearm and a hand rest that is arranged to support a user's hand.

8. A bilateral upper limb exercise device according claim 1 wherein the limb supports are provided with one or more removable hand grip or hand support devices that are arranged to be gripped by a user and which are releasably mountable to the limb support.

9. A bilateral upper limb exercise device according to claim 8 wherein the one or more hand grip devices is in the form of a joystick component that is securable to the limb support at a desired position and orientation.

10. A bilateral upper limb exercise device according to claim 8 wherein the one or more hand support devices is in the form of a hemispherical shaped support component over which the palm of the user's hand may rest.

11. A bilateral upper limb exercise device according to claim 1 wherein at least one of the limb supports comprises one or more securing straps that may be fastened around the user's forearm and/or hand to secure it into the limb support.

12. A bilateral upper limb exercise device according to claim 1 wherein the mirroring mechanism comprises a gearing system that is operatively coupled to the articulated linkage arms such that movement of either linkage arm in the 2D movement plane causes a corresponding mirrored movement of the other linkage arm about the line of symmetry.

13. A bilateral upper limb exercise device according to claim 12 wherein the mirroring mechanism comprises a first pair of gears, each gear extending from an end of a respective inner arm of the articulated linkage arms at the central mounting structure and which mesh together at the line of symmetry of the central mounting structure; and a second pair of gears at the central mounting structure, each gear being operatively coupled by a connecting rod to a respective outer arm of the articulated linkage arms and which mesh together at the line of symmetry of the central mounting structure, the first and second set of gears rotating in response to pivotal movement of either of their respective inner and outer arms so as to cause a corresponding mirrored pivotal movement of the other inner and outer arms.

14. A bilateral upper limb exercise device according to claim 13 wherein the exercise device further comprises an adjustable resistance system that is operable to apply a level of resistive force to movement of the limb supports in the 2D movement plane.

15. A bilateral upper limb exercise device according to claim 14 wherein the adjustable resistance system comprises first and second adjustable friction brakes associated with the respective first and second pairs of gears, each adjustable friction brake comprising a brake pad that is arranged to contact a surface of one of the gears of its respective pair of gears and an operable brake tensioner that is operable by a user to increase or reduce the pressure applied to the gear by the brake pad as desired to alter the resistance applied to movement of the limb supports.

16. A bilateral upper limb exercise device according to claim 1 wherein the mirroring mechanism comprises a slider track that extends along the line of symmetry; and first and second sliders that are arranged for slidable movement along the slider track, the first slider being operatively coupled to inner arms of the articulated linkage arms and the second slider being operatively coupled to outer arms of the articulated linkage arms such that movement of either linkage arm in the 2D movement plane causes a corresponding mirrored movement of the other linkage arm about the line of symmetry.

17. A bilateral upper limb exercise device according to claim 16 wherein the exercise device further comprises an adjustable resistance system that is operable to apply a level of resistive force to movement of the limb supports in the 2D movement plane.

18. A bilateral upper limb exercise device according to claim 17 wherein the adjustable resistance system comprises a braking clamp or braking caliper that is mounted to each slider and which is operable to clamp to the slider track with varying degrees of force to thereby resist movement of the sliders along the slider track and therefore resist movement of the limb supports in their 2D movement plane as desired.

19. A bilateral upper limb exercise device according to claim 17 wherein the adjustable resistance system comprises two non-rotating pulleys, one mounted to each slider, and a tensioning cable or rope that is wrapped around the pulleys such that a tension of the rope can be adjusted to increase resistance on movement of the pulleys and thereby their respective sliders along the slider track.

20. A bilateral upper limb exercise device according to claim 1 wherein the mirroring mechanism comprises an elongate slider track that defines the line of symmetry; a first slider that is arranged for slidable movement along the slider track and which is operatively coupled to inner arms of the articulated linkage arms by respective connecting rods such that pivotal movement of one inner arm causes a corresponding mirrored movement of the other inner arm about the line of symmetry; and a second slider that is arranged for slidable movement along the slider track and which is operatively coupled to outer arms of the articulated linkage arms by respective connecting rods such that pivotal movement of one outer arm causes a corresponding mirrored movement of the other outer arm.

21. A bilateral upper limb exercise device according to claim 20 wherein the exercise device further comprises an adjustable resistance system that is operable to apply a level of resistive force to movement of the limb supports in the 2D movement plane.

22. A bilateral upper limb exercise device according to claim 21 wherein the adjustable resistance system comprises a braking clamp or braking caliper that is mounted to each slider and which is operable to clamp to the slider track with varying degrees of force to thereby resist movement of the sliders along the slider track and therefore resist movement of the limb supports in their 2D movement plane as desired.

23. A bilateral upper limb exercise device according to claim 21 wherein the adjustable resistance system comprises two non-rotating pulleys, one mounted to each slider, and a tensioning cable or rope that is wrapped around the pulleys such that a tension of the rope can be adjusted to increase resistance on movement of the pulleys and thereby their respective sliders along the slider track.

24. A bilateral upper limb exercise device according to any claim 1 wherein the central mounting structure comprises an adjustable tilting mechanism that is operable to adjust the tilt of the 2D movement plane relative to a horizontal.

25. A bilateral upper limb exercise device according to claim 1 wherein the central mounting structure comprises a slidable support clamp that is securable to an upright member extending vertically from a fixed structure or surface, the support clamp being releasable to allow a height of the exercise device to be adjusted by slidable movement of the support clamp up or down the upright member.

26. A bilateral upper limb exercise device according to claim 1 wherein the central mounting structure comprises a rotatable support clamp that is securable to an upright member extending vertically from a fixed structure or surface, the support clamp being releasable to allow a position of the exercise device to be adjusted by rotatable movement of the support clamp about the upright member.

27. A bilateral upper limb exercise device according to claim 1 wherein the central mounting structure is arranged to allow free vertical movement of the exercise device to thereby provide a third degree of freedom of movement for the limb supports.

28. A bilateral upper limb exercise device according to claim 1 further comprising a balance sensing and feedback system that is arranged to continuously sense a load applied to each of the articulated linkage arms during movement of the limb supports and output data representing a balance of work done between the user's left and right arms.

29. A bilateral upper limb exercise device according to claim 28 wherein a balance sensing and feedback system comprises two loadcell sensors, each being operatively coupled to a respective articulated linkage arm and being configured to sense load applied through the arm during movement of the limb support by the user and generating representative output load signals for processing.

30. An exercise system comprising:
   a bilateral upper limb exercise device according to claim 1;
   a position tracking system that is arranged to sense and track movement of the limb supports of the exercise device and generate representative position data for tracking movement of the limb supports in the 2D movement plane; and
   an interface for sending the position data to an associated interactive gaming system to enable a user of the exercise device to interact with the gaming system via movement of the limb supports.

31. An exercise system according to claim 30 wherein the interactive gaming system is in a form of a personal computer having a display screen upon which a game is present and the personal computer being programmed to receive and process the position data as user input to interact with the game.

32. An exercise system according to claim 30 wherein the position tracking system comprises a camera that is arranged to capture continuous images of a portion of the 2D movement plane and an image processing system that is arranged to process the images to sense and track movement of one or both limb supports that are visible in the portion of the 2D movement plane to generate representative position data.

33. An exercise system according to claim 30 wherein the position tracking system comprises one or more movement sensors integrated into the articulated linkage arms of the exercise device and which are arranged to sense pivotal movement of the arms and generate representative position data.

34. An exercise system according to claim 30 further comprising a balance sensing and feedback system that is arranged to continuously sense a load applied to each of the articulated linkage arms during movement of the limb supports and output data representing a balance of work done between the user's left and right arms.

35. An exercise system according to claim 30 further comprising a line-tracing game that displays a target line for the user to trace with a cursor that is controlled via movement of one of the limb supports.

36. An exercise system comprising:
   a bilateral upper limb exercise device according to claim 1;
   a position tracking system that is arranged to sense and track movement of the limb supports of the exercise device and generate representative position data for tracking movement of the limb supports in the 2D movement plane; and
   an interactive gaming system that is arranged to receive the position data as input to enable a user to interact with a game presented on a display screen.

37. A method of bilateral upper limb exercise training, comprising:
   providing an exercise system according to claim 36; and
   initiating a user interactive game on the gaming system to motivate the user to carry out exercise on the bilateral upper limb exercise device of the exercise system.

38. An exercise system according to claim 36 wherein the interactive gaming system is in a form of a personal computer having a display screen upon which the game is present and the personal computer being programmed to receive and process the position data as user input to interact with the game.

39. An exercise system according to claim 36 wherein the position tracking system comprises a camera that is arranged to capture continuous images of a portion of the 2D movement plane and an image processing system that is arranged to process the images to sense and track movement of one or both limb supports that are visible in the portion of the 2D movement plane to generate representative position data.

40. An exercise system according to claim 36 wherein the position tracking system comprises one or more movement sensors integrated into the articulated linkage arms of the exercise device and which are arranged to sense pivotal movement of the arms and generate representative position data.

41. An exercise system according to claim 36 further comprising a balance sensing and feedback system that is arranged to continuously sense a load applied to each of the articulated linkage arms during movement of the limb supports and output data representing a balance of work done between the user's left and right arms.

42. An exercise system according to claim 36 wherein the game is a line-tracing game that displays a target line for the user to trace with a cursor that is controlled via movement of one of the limb supports.

43. A bilateral upper limb exercise device for exercising a user's arms, comprising:
   a base support that is mountable to a fixed surface or structure;
   left and right limb supports provided in a symmetrical arrangement on opposite sides relative to the base support for supporting a forearm and/or hand of a respective arm of the user;
   a support system arranged to support each limb support for translational movements in at least two degrees of freedom, including back-and-forth and side-to-side movements, within a movement plane that is common to both limb supports; and a mirroring mechanism that is operatively coupled to the limb supports and/or support system such that movement of one limb support by a user causes a corresponding mirrored movement of the opposing limb support relative to a central line of symmetry of the base support.

* * * * *